United States Patent
Kano et al.

(10) Patent No.: US 7,690,455 B2
(45) Date of Patent: Apr. 6, 2010

(54) HYBRID DRIVE DEVICE AND AUTOMOBILE MOUNTED WITH DEVICE

(75) Inventors: Seigo Kano, Aichi-ken (JP); Kenji Omote, Aichi-ken (JP); Satoru Wakuta, Aichi-ken (JP); Tomochika Inagaki, Aichi-ken (JP); Masatoshi Adachi, Aichi-ken (JP); Masahiro Kojima, Aichi-ken (JP)

(73) Assignees: Toyota Jidosha Kabushiki Kaisha, Aichi-ken (JP); Aisin AW Co., Ltd., Aichi-ken (JP)

( * ) Notice: Subject to any disclaimer, the term of this patent is extended or adjusted under 35 U.S.C. 154(b) by 627 days.

(21) Appl. No.: 10/532,840

(22) PCT Filed: Jun. 30, 2004

(86) PCT No.: PCT/JP2004/009199

§ 371 (c)(1),
(2), (4) Date: Oct. 3, 2005

(87) PCT Pub. No.: WO2005/000618

PCT Pub. Date: Jan. 6, 2005

(65) Prior Publication Data

US 2006/0169502 A1 Aug. 3, 2006

(30) Foreign Application Priority Data

Jun. 30, 2003 (JP) .............................. 2003-189119

(51) Int. Cl.
*B60K 6/40* (2007.10)

(52) U.S. Cl. .................... 180/65.235; 903/951

(58) Field of Classification Search .................. 180/292, 180/65.2, 65.3, 65.4, 65.21, 65.235, 65.25, 180/65.31; 475/5; 903/911
See application file for complete search history.

(56) References Cited

U.S. PATENT DOCUMENTS

| 1,918,490 | A | * | 7/1933 | Riley ........................... 180/291 |
| 3,236,326 | A | * | 2/1966 | Reynolds ..................... 180/292 |
| 3,623,568 | A | | 11/1971 | Mori |
| 5,129,479 | A | | 7/1992 | Fujii et al. |
| 5,603,671 | A | * | 2/1997 | Schmidt ......................... 475/5 |
| 5,904,631 | A | | 5/1999 | Morisawa et al. |
| 5,935,035 | A | * | 8/1999 | Schmidt ......................... 475/5 |
| 6,022,287 | A | * | 2/2000 | Klemen et al. ................. 475/5 |
| 6,478,705 | B1 | | 11/2002 | Holmes et al. |

(Continued)

FOREIGN PATENT DOCUMENTS

DE 197 17 884 A1 2/1998

(Continued)

*Primary Examiner*—Frank B Vanaman
(74) *Attorney, Agent, or Firm*—Sughrue Mion, PLLC

(57) ABSTRACT

A hybrid driving unit (7) is mounted to a vehicle by coupling a coupling section (14d) at the front end of a casing member (14) with an internal combustion engine (5) and by mounting a mounting section (14c) at the rear end of the casing member (14) to a part (4a) of a body (4). Still more, a second electric motor (23), i.e., a heavy device, is disposed in the rearmost part among a first electric motor (20), a power splitting planetary gear (21), the second electric motor (23) and a transmission disposed on an axis (13) in the casing member (14). Thereby, the vibration occurring in the casing member (14) is suppressed.

24 Claims, 16 Drawing Sheets

U.S. PATENT DOCUMENTS

2003/0064854 A1  4/2003  Kotani
2004/0084233 A1  5/2004  Wakuta et al.

FOREIGN PATENT DOCUMENTS

| | | |
|---|---|---|
| EP | 1 253 036 A1 | 10/2002 |
| JP | 47-31773 | 8/1972 |
| JP | 3182837 | 8/1991 |
| JP | 06-144020 A | 5/1994 |
| JP | 07-135701 A | 5/1995 |
| JP | 08-183347 A | 7/1996 |
| JP | 10-058990 A | 3/1998 |
| JP | 2000-346187 A | 12/2000 |
| JP | 2002-225578 A | 8/2002 |
| JP | 2003-191761 A | 7/2003 |
| WO | WO 03/055709 A1 | 12/2002 |

* cited by examiner

HYBRID DRIVE DEVICE AND AUTOMOBILE MOUNTED WITH DEVICE

The disclosure of Japanese Patent Application No. 2003-189119 filed on Jun. 30, 2003 including the specification, drawings and abstract is incorporated herein by reference in its entirety.

TECHNICAL FIELD

The present invention relates to a vehicular hybrid driving unit and a vehicle carrying the same and more specifically to a layout of two electric motors, a power splitting planetary gear and a transmission disposed within a casing member.

BACKGROUND ART

Hitherto, there has been known a so-called mechanical power splitting (split type or two-motor type) hybrid driving unit, to be mounted to a vehicle, in which an engine, a generator and a driving (assist) electric motor are connected respectively to three elements of a planetary gear, the driving electric motor is coupled with an output shaft, output torque of the above-mentioned planetary gear unit is continuously controlled through control of the generator, and torque of the other driving electric motor is combined with the output torque of the planetary gear to be outputted to the output shaft as necessary.

The hybrid driving unit described above is disclosed, for instance, in Japanese Patent Laid-Open No. Hei. 08-183347 as a unit for an FF (front-engine and front-drive) type vehicle and in Japanese Patent Laid-Open No. 2002-225578 as a unit provided with a transmission between an electric motor and an output shaft.

By the way, the position and direction of the hybrid driving unit to be mounted will totally differ from those of the FF type vehicle in mounting such unit to an FR (front-engine and rear-drive) vehicle.

That is, as for the hybrid driving unit for the FF type vehicle described above, an engine is transversely mounted (so that its crank shaft faces in the transverse direction of the body) and the hybrid driving unit is coupled with one end of the engine so that the longitudinal direction (the direction along its input and output shafts) of a casing member thereof faces to the transverse direction of the body. These engine and hybrid driving unit are stored in an engine room generally provided in the front part of the body. Meanwhile, as for the hybrid driving unit for the FR type vehicle, an engine is mounted longitudinally (so that a crank shaft faces in the longitudinal direction of the body) within an engine room and the hybrid driving unit is mounted to the rear end thereof so that the longitudinal direction of the casing member faces in the longitudinal direction of the body. Therefore, the hybrid driving unit is generally disposed under a compartment between a driver's seat and an assistant driver's seat in the longitudinal direction. Accordingly, concerning to its position, direction and mountability, the hybrid driving unit for the FR-type vehicle is restricted considerably as compared to those of the FF-type. Still more, because the position where it is mounted is close to the compartment as described above, it is strongly desired to reduce its vibration.

DISCLOSURE OF INVENTION

Accordingly, it is an object of the invention to provide a hybrid driving unit, and a vehicle carrying the same, whose vibration is reduced, thus solving the aforementioned problem, by disposing one electric motor (among two electric motors) which is a heavy device in the hybrid driving unit in the rearmost part of the casing member, by fixing the front end of the casing member to an internal combustion engine and by mounting the rear end of the casing member to the body.

According to a first aspect of the invention (see FIGS. 2 and 3 for example), a hybrid driving unit (7A) comprises:

an input shaft (10) for inputting motive power from an internal combustion engine;

an output shaft (12) disposed on an axis (13) in line with the input shaft (10) and interlocking with driving wheels (3);

a first electric motor (20) disposed on the axis (13) and having a stator (24) and a rotor (25);

a power splitting planetary gear (21) disposed on the axis (13) and having a first rotary element (R0) coupled with the input shaft (10), a second rotary element (S0) coupled with the rotor (25) of the first electric motor (20) and a third rotary element (CR0) coupled with the output shaft (12);

a second electric motor (23) disposed on the axis (13) and having a stator (28) and a rotor (29); and a transmission (22) disposed on the axis (13) and shifting and transmitting revolution of the rotor (29) of the second electric motor (23) to the output shaft (12); and the hybrid driving unit (7A) being characterized in that:

the first electric motor (20), the power splitting planetary gear (21), the second electric motor (23) and the transmission (22) are stored in a casing member (14) while being disposed in line on the axis (13);

the stators (24 and 28) of the first and second electric motors (20 and 23) are fixed to the casing member (14);

the casing member (14) is provided, at the front end thereof, with a coupling section (14d) which can be fixed to the internal combustion engine and at the rear end thereof, with a mounting section (14c) which can be supported by a body (4); and one (23) of the first and second electric motors (20 and 23) is disposed in the rearmost part among the first electric motor (20), the power splitting planetary gear (21), the second electric motor (23) and the transmission (22) disposed in the casing member (14) along the axis (13).

According to a second aspect of the invention (see FIGS. 2 and 3 for example), the hybrid driving unit (7A) is characterized in that supporting members (D and E) extending from the casing member (14) support the both sides of the rotor (29) of the electric motor, among the first and second electric motors (20 and 23), disposed in the rearmost end through an intermediary of bearing members (r, s); and the mounting section (14c) is provided at the position axially overlapping with the rear supporting member (E) among the supporting members (D and E).

According to a third aspect of the invention (see FIGS. 2 and 3 for example), ), the hybrid driving unit (7A) is characterized in that the output shaft (12) is disposed through the inner peripheral side of one of the first and second electric motors (20, 23) and is supported by the rotor of the one of the first and second electric motors (20, 23) through an intermediary of bearing members (j, t).

According to a fourth aspect of the invention (see FIGS. 2 and 3 for example), the hybrid driving unit (7A) is characterized in that the other one (20) of the first and second electric motors (20, 23) is disposed in the foremost part among the first electric motor (20), the power splitting planetary gear (21), the second electric motor (23) and the transmission (22) disposed on the axis (13) in the casing member (14).

According to a fifth aspect of the invention (see FIGS. 2 and 3 for example), the hybrid driving unit (7A) is characterized in that supporting members (A and B) extending from the casing member (14) support the rotor (25) of the other one of the first and second electric motors (20 and 23) through an intermediary of bearing members (a and b), and input shaft (10) is coupled with the power splitting planetary gear (21) through the inner peripheral side of the rotor (25) of the other motor and is supported by the rotor (25) of the other motor through an intermediary of bearing members (c, d).

According to a sixth aspect of the invention, the hybrid driving unit (7A) is characterized in that the first electric motor (20), the transmission (22), the power splitting planetary gear (21) and the second electric motor (23) are disposed in order from the side closer to the internal combustion engine.

According to a seventh aspect of the invention (see FIGS. 2 and 3 for example), the hybrid driving unit (7A) is characterized in that the input shaft (10) passes through the inner peripheral side of the first electric motor (20) and the transmission (22) and is coupled with the first rotary element (R0), and the output shaft (12) passes through the inner peripheral side of the transmission (22) and the second electric motor (23).

According to an eighth aspect of the invention (see FIGS. 2 and 3 for example), the hybrid driving unit (7A) is characterized in that the power splitting planetary gear (21) comprises a single pinion planetary gear train, the input shaft (10) passes through the inner peripheral side of the power splitting planetary gear (21) and is coupled with the transmission (22) side of a carrier (CR0) of the single pinion planetary gear train, the output shaft (12) passes adjacent to the power splitting planetary gear (21) and the transmission (22) and is coupled with a ring gear (RO) of the single pinion planetary gear train, and the rotor (25) of the first electric motor (20) is coupled with a sun gear (SO) of the single pinion planetary gear train.

According to a ninth aspect of the invention (see FIG. 4 for example), the hybrid driving unit (7A) is characterized in that the power splitting planetary gear (21) comprises a single pinion planetary gear train, the input shaft (10) passes adjacent to the first electric motor (20) and the power splitting planetary gear (21) and is coupled with the carrier (CR0) of the single pinion planetary gear train on the side of the first electric motor (20), the output shaft (12) is coupled with the sun gear (SO) of the single pinion planetary gear, and the rotor (25) of the first electric motor (20) is coupled with the ring gear (RO) of the single pinion planetary gear.

According to a tenth aspect of the invention (see FIG. 5 for example), the hybrid driving unit (7A) is characterized in that the power splitting planetary gear (21) comprises a double pinion planetary gear train, the input shaft (10) passes through the inner peripheral side of the power splitting planetary gear (21) and is coupled with the ring gear (R0) of the double pinion planetary gear train, the output shaft (12) passes through the outer peripheral side of the power splitting planetary gear (21) and between the rotor (25) of the first electric motor (20) and the power splitting planetary gear (21) and is coupled with the carrier (CR0) of the double pinion planetary gear train on the first electric motor (20) side, and the rotor (25) of the first electric motor (20) is coupled with the sun gear (S0) of the double pinion planetary gear train.

According to an eleventh aspect of the invention (see FIG. 6 for example), the hybrid driving unit (7A) is characterized in that the power splitting planetary gear (21) comprises a double pinion planetary gear train, the input shaft (10) passes adjacent to the first electric motor (20) and the power splitting planetary gear (21) and is coupled with the ring gear (RO) of the double pinion planetary gear train, the output shaft (12) is coupled with the sun gear (SO) of the double pinion planetary gear, and the rotor (25) of the first electric motor (20) is coupled with the carrier (CR0) of the double pinion planetary gear on the transmission (22) side through the outer peripheral side of the power splitting planetary gear (21).

According to a twelfth aspect of the invention (see FIG. 7 for example), the hybrid driving unit (7B) is characterized in that the power splitting planetary gear (21), the first electric motor (20), the transmission (22) and the second electric motor (23) are disposed in order from the side closer to the internal combustion engine (5).

According to a thirteenth aspect of the invention (see FIG. 7 for example), the hybrid driving unit (7B) is characterized in that the output shaft (11) passes through the inner peripheral side of the power splitting planetary gear (21), the first electric motor (20), the transmission (22) and the second electric motor (23).

According to a fourteenth aspect of the invention (see FIG. 7 for example), the hybrid driving unit (7B) is characterized in that the power splitting planetary gear (21) comprises a single pinion planetary gear train, the input shaft (10) is coupled with the front side of the carrier (CR0) of the single pinion planetary gear train, the output shaft (12) is coupled with the sun gear (R0) of the single pinion planetary gear train, and the rotor (25) of the first electric motor (20) is coupled with the ring gear (R0) of the single pinion planetary gear train.

According to a fifteenth aspect of the invention (see FIG. 9 for example), the hybrid driving unit (7B) is characterized in that the power splitting planetary gear (21) comprises a single pinion planetary gear train, the input shaft (10) is coupled with the carrier (CR0) of the single pinion planetary gear train on the side of the first electric motor (20), the output shaft (12) is coupled with the ring gear (R0) of the single pinion planetary gear through the part between the power splitting planetary gear (21) and the first electric motor (20), and the rotor (25) of the first electric motor (20) is coupled with the front side of the carrier (CR0) of the single pinion planetary gear through the outer peripheral side of the power splitting planetary gear (21).

According to a sixteenth aspect of the invention (see FIG. 10 for example), the hybrid driving unit (7B) is characterized in that the power splitting planetary gear (21) comprises a double pinion planetary gear train, the input shaft (10) is coupled with the ring gear (RO) of the double pinion planetary gear train, the output shaft (12) is coupled with the carrier (CR0) of the double pinion planetary gear train through the part between the input shaft (10) and the power splitting planetary gear (21), and the rotor (25) of the first electric motor (20) is coupled with the sun gear (SO) of the double pinion planetary gear train.

According to a seventeenth aspect of the invention (see FIG. 11 for example), the hybrid driving unit (7B) is characterized in that the power splitting planetary gear (21) comprises a double pinion planetary gear train, the input shaft (10) is coupled with the ring gear (R0) of the double pinion planetary gear train, the output shaft (12) is coupled with the sun gear (S0) of the double pinion planetary gear, and the rotor (25) of the first electric motor (20) is coupled with the carrier (CR0) of the double pinion planetary gear on the rotor (25) side of the first electric motor (20).

According to an eighteenth aspect of the invention (see FIGS. 12 and 13 for example), the hybrid driving unit (7C) is characterized in that the second electric motor (23), the transmission (22), the power splitting planetary gear (21) and the first electric motor (20) are disposed in order from the side closer to the internal combustion engine (5).

According to an nineteenth aspect of the invention (see FIGS. 12 and 13 for example), the hybrid driving unit (7C) is characterized in that the input shaft (10) is coupled with the first rotary element (R0) through the inner peripheral side of the second electric motor (23) and the transmission (22), the output shaft (12) passes through the inner peripheral side of the first electric motor (20), and the output element (CR1) of the transmission (22) is coupled with the output shaft (12) through the outer peripheral side of the power splitting planetary gear (21).

According to a twentieth aspect of the invention (see FIGS. 12 and 13 for example), the hybrid driving unit (7C) is characterized in that the power splitting planetary gear (21) comprises a double pinion planetary gear train, the input shaft (10) passes adjacent to the transmission (22) and the power splitting planetary gear (21) and is coupled with the ring gear (R0) of the double pinion planetary gear train, the output shaft (12) is coupled with the carrier (CR0) of the double pinion planetary gear on the side of the transmission (22) through the inner peripheral side of the power splitting planetary gear (21), the rotor (25) of the first electric motor (20) is coupled with the sun gear (S0) of the double pinion planetary gear, and the output element (CR1) of the transmission (22) is coupled with the carrier (CR0) of the double pinion planetary gear on the transmission (22) side through the outer peripheral side of the power splitting planetary gear (21).

According to a 21-st aspect of the invention (see FIG. 14 for example), the hybrid driving unit (7D) is characterized in that the first electric motor (20), the transmission (22), the power splitting planetary gear (21) and the first electric motor (23) are disposed in order from the side closer to the internal combustion engine (5).

According to a 22-nd aspect of the invention, the hybrid driving unit (7D) is characterized in that the input shaft (10) is coupled with the first rotary element (R0) through the inner peripheral side of the first electric motor (20), the transmission (22) and the power splitting planetary gear (21), the output shaft (12) passes through the inner peripheral side of the second electric motor (23), the output element (CR1) of the transmission (22) is coupled with the output shaft (12) through the outer peripheral side of the power splitting planetary gear (21), and the rotor 29 of the second electric motor (23) is coupled with the input element (S1) of the transmission (22) through the outer peripheral side of the power splitting planetary gear (21).

According to a 23-rd aspect of the invention (see FIG. 14 for example), the hybrid driving unit (7) is characterized in that the power splitting planetary gear (21) comprises a double pinion planetary gear train, the input shaft (10) passes through the part between the power splitting planetary gear (21) and the second electric motor (23) and is coupled with the ring gear (R0) of the double pinion planetary gear train, the output shaft (12) is coupled with the carrier (CR0) of the double pinion planetary gear on the side of the transmission (22) through the outer peripheral side of the power splitting planetary gear (21), the rotor (25) of the first electric motor (20) is coupled with the sun gear (S0) of the double pinion planetary gear through the inner peripheral side of the transmission (22), and the output element (CR1) of the transmission (22) is coupled with the carrier (CR1) of the double pinion planetary gear on the transmission (22) side.

According to a 24-th aspect of the invention (see FIGS. 2 through 14 for example), the hybrid driving unit (7A, 7B, 7C, 7D) is characterized in that the transmission (22) has a planetary gear (27).

According to a 25-th aspect of the invention, the hybrid driving unit (7A, 7B, 7C, 7D) is characterized in that the transmission (22) has at least four shifting elements, the first shifting element (S1) is coupled with the rotor (29) of the second electric motor (23), the second shifting element (CR1) is coupled with the output shaft (12) and the transmission (22) has braking elements (B1 and B2) which are capable of fixing the third and fourth shifting elements (R1 and S2) to the case (14), respectively.

According to a 26-th aspect of the invention (see FIGS. 2 through 14 for example), the hybrid driving unit (7A, 7B, 7C, 7D) is characterized in that the planetary gear of the transmission (22) comprises a Ravigneaux type planetary gear and the carrier (CR1) of the Ravigneaux type planetary gear is coupled with the output shaft (12).

According to a 27-th aspect of the invention, the hybrid driving unit (7) is characterized in that one of the first and second electric motors (20 and 23) is a device heavier than the power splitting planetary gear (21) and the transmission (22).

According to a 28-th aspect of the invention (see FIG. 15 for example), the hybrid driving unit (7) is characterized in that supporting members (D and E) extending from the casing member (14) support the both sides of the rotor (29) of the electric motor (23) disposed in the rearmost end among the first and second electric motors (20 and 23) through an intermediary of bearing members (r, s) and the mounting section (14c) is provided between the front supporting member (D) and the rear supporting member (E).

According to the 29-th aspect of the invention (see FIG. 16 for example), the hybrid driving unit (7) is charaterized in that supporting members (D and E) extending from the casing member (14) support the both sides of the rotor (29) of the electric motor (23) disposed in the rearmost end among the first an second electric motors (20 and 23) through an intermediary of bearing members (r, s) and the mounting section (14c) is provided at the position on the rearside of the rear supporting member (D or E) among the supporting members (D or E).

According to a 30-th aspect of the invention (see FIG. 1 for example), a vehicle (1) comprising an internal combustion engine (5), hybrid driving means and rear wheels (3) as driving wheels to which driving force is transmitted from the hybrid driving means is characterized in that the hybrid driving means is the hybrid driving unit (7A, 7B, 7C, 7D) described in anyone of claims 1 through 29 the invention; and the hybrid driving unit (7A, 7B, 7C, 7D) is disposed such that the input shaft (10) and the output shaft (12) on the axis (13) are longitudinally disposed approximately on one and same axial line with a propeller shaft (16) as the internal combustion engine (5) is disposed on the front side of the body (4).

It is noted that the reference numerals within the parentheses described above are cited for the purpose of collating with the drawings and do not by any means affect the composition of the claims.

According to the first aspect of the invention, since the coupling section at the front end of the casing member is coupled with the internal combustion engine, the casing member is mounted to the body through the mounting section at the rear end thereof, and one of the first and second electric motors which are the heavy devices is disposed in the rearmost end among the first electric motor, the power splitting planetary gear, the second electric motor and the transmission disposed on the axis in the casing member, bending moment whose mid-point is the mounting section may be reduced and a distance between a mount for supporting the engine to the body and the mounting section of the hybrid driving unit may be prolonged. Accordingly, it becomes possible to suppress vibration occurring in the casing member and to reduce vibration propagating from the casing member to the body.

According to the second aspect of the invention, the accuracy for supporting the rotor improves by supporting the both ends of the rotor of the electric motor, among the first and second electric motors, disposed in the rearmost end of the casing member by the supporting members extending from the casing member through the intermediary of the bearing members. Accordingly, the gap between the stator and the rotor may be reduced and an output of the electric motor may be increased. Still more, because the rigidity for supporting the rotor improves by providing the mounting section at the position axially overlapping with the rear supporting member, it becomes possible to suppress the vibration occurring in the casing member and to reduce the vibration propagating from the casing member to the body.

According to the third aspect of the invention, since the output shaft is disposed through the inner periphery of one of the first and second electric motors and the rotor of one of the first and second electric motors is supported through the bearing members, it becomes possible to steadily support the output shaft by the rotor steadily supported by the supporting members even if the axial length of the output shaft becomes long as it passes through the inner periphery of the electric motor. Accordingly, the assurance of the rigidity of the output shaft enables the diameter of the output shaft to be suppressed and the diameter of the hybrid driving unit to be reduced.

According to the fourth aspect of the invention, since the one of the first and second electric motors, which are heavy devices, is disposed at the rearmost end and the other one is disposed at the foremost end, i.e., at the positions closest to the mounting section of the hybrid driving unit and to the mount for supporting the engine, it becomes possible to suppress the vibration occurring in the casing member further and to reduce the vibration propagating from the casing member to the body. Still more, since the diameter of the other electric motor may be increased, the axial length of the hybrid driving unit may be shortened by shortening the axial length of the other electric motor.

According to the fifth aspect of the invention, since the supporting members extending from the casing member support the rotor of the other one of the first and second electric motors through an intermediary of the bearing members and the input shaft is coupled with the power splitting planetary gear through the inner periphery of the rotor of the other one and is supported by the rotor of the other one through the intermediary of the bearing members, the casing member can steadily support the input shaft through the rotor of the other one even though the input shaft extends by passing through the inner periphery of the rotor of the other one. Accordingly, the assurance of the rigidity of the input shaft enables its diameter to be suppressed and the diameter of the hybrid driving unit to be reduced.

According to the sixth to eighth aspects of the invention, since the first electric motor, the power splitting planetary gear, the transmission and the second electric motor are disposed in order from the side closer to the internal combustion engine, it becomes possible to attain the hybrid driving unit without multiplexing axes by providing the power splitting planetary gear and the transmission adjacent to the first and second electric motors, respectively, while suppressing the vibration occurring in the casing member by providing the second and first electric motors at the front and rear ends of the hybrid driving unit. Accordingly, it becomes possible to downsize the hybrid driving unit.

It is noted that the invention may be achieved without complicating the disposition by coupling the first electric motor, the power splitting planetary gear, the second electric motor and the transmission as described in the seventh to eleventh aspects of the invention.

According to the twelfth aspect of the invention, since the power splitting planetary gear, the first electric motor, the transmission and the second electric motor are disposed in order from the side closer to the internal combustion engine, it becomes possible to attain the hybrid driving unit without multiplexing axes by providing the power splitting planetary gear and the transmission adjacent to the first and second electric motors, respectively, while suppressing the vibration occurring in the casing member by providing the second electric motor at the rear end of the hybrid driving unit. Still more, because only the power splitting planetary gear is disposed on the front side of the first electric motor and the axial length of the power splitting planetary gear is shorter than that of the transmission, the first electric motor may be also securely supported.

It is noted that the invention may be achieved without complicating the disposition by coupling the first electric motor, the power splitting planetary gear, the second electric motor and the transmission as described in the thirteenth to seventeenth aspects of the invention.

According to the eighteenth aspect of the invention, since the second electric motor, the transmission, the power splitting planetary gear and the first electric motor are disposed in order from the side closer to the internal combustion engine and the second electric motor which is required to output a higher output than the first electric motor may be provided at the foremost part, it becomes possible to suppress the vibration occurring in the casing member by providing the first and second electric motors at the front and rear ends of the hybrid driving unit while shortening the axial length of the hybrid driving unit further by increasing the diameter of the second electric motor.

It is noted that the invention may be achieved without complicating the disposition by coupling the first electric motor, the power splitting planetary gear, the second electric motor and the transmission as described in the nineteenth and twentieth aspects of the invention.

According to the 21-st aspect of the invention, the vibration occurring in the casing member may be suppressed by disposing the first electric motor, the transmission, the power splitting planetary gear and the second electric motor in order from the side closer to the internal combustion engine.

It is noted that the invention may be achieved without complicating the disposition by coupling the first electric motor, the power splitting planetary gear, the second electric motor and the transmission as described in the 22-nd and 23-rd aspects of the invention.

According to the 24-th aspect of the invention, since the transmission comprises the planetary gear and may be provided on one axis, the diameter of the hybrid driving unit may be reduced.

According to the 25-th aspect of the invention, since the transmission has at least four shift elements, the first shifting element is coupled with the rotor of the second electric motor, the second shifting element is coupled with the output shaft, and the transmission has braking elements which are capable of fixing the third and fourth shifting elements to the case, respectively, it is possible to reduce the rotational speed of the rotor of the second electric motor at least at two stages just by providing the brakes. Here, when a clutch is used to shift the speeds, a hydraulic servo of the clutch is provided on the center axis in general to supply oil to the hydraulic servo of the clutch and a plurality of seal rings are used to prevent leakage of oil among rotational members. In contrary to that, the inventive brake requires no seal ring like the clutch and the hydraulic servo needs not be provided on the center axis because the hydraulic servo of the inventive brake may be provided in the case. Accordingly, because the axial length of the hybrid driving unit may be shortened by composing the two stages of shift just by the brakes, the rigidity of the case is improved and the efficiency thereof may be improved through the reduction of the seal rings.

According to the 26-th aspect of the invention, the planetary gear of the transmission comprises the Ravigneaux type planetary gear. Because the Ravigneaux type planetary gear allows the carriers of two planetary gears to be used in common, the axial length of the transmission may be shortened. Still more, although the size of the carrier increases by commonly using the carriers of the two planetary gears, it is possible to suppress vibration caused by whirling of the transmission because the carrier may be securely supported by coupling the carrier with the output shaft.

According to the 28-th aspect of the invention, since the accuracy for supporting the rotor may improved by supporting the both sides of the rotor of the electric motor disposed at the rear end, among the first and second electric motors, by the supporting members extending from the casing member through the intermediary of the bearing members, the gap between the stator and the rotor may be reduced and the output of the electric motor may be improved. Still more, since the mounting section is provided between the two supporting members, i.e., at the position overlapping with the electric motor disposed in the rearmost part, and is located at the position close to the center of gravity of the heavy electric motor, it becomes possible to suppress the vibration of the casing member and becomes advantageous in terms of resonance of the power train and sound filled therein.

According to the 29-th aspect of the invention, since the accuracy for supporting the rotor may be improved by supporting both sides of the rotor of the electric motor disposed at the rear end, among the first and second electric motors, by the supporting members extending from the casing member through the intermediary of the bearing members, the gap between the stator and the rotor may be reduced and the output of the electric motor may be improved. Still more, since the mounting section is provided behind the rear supporting member, it may be set at the part of the casing member in which the diameter is small. It allows the hybrid driving unit to be mounted to the body in compact.

The 30-th aspect of the invention relates to the FR-type vehicle carrying the inventive hybrid driving unit. Because the inventive vehicle is capable of suppressing the vibration occurring in the hybrid driving unit and of reducing the vibration of the vehicle caused by the vibration of the hybrid driving unit, the vibration propagating to passengers through the body and others is reduced.

BEST MODES FOR CARRYING OUT THE INVENTION

Figure 1:
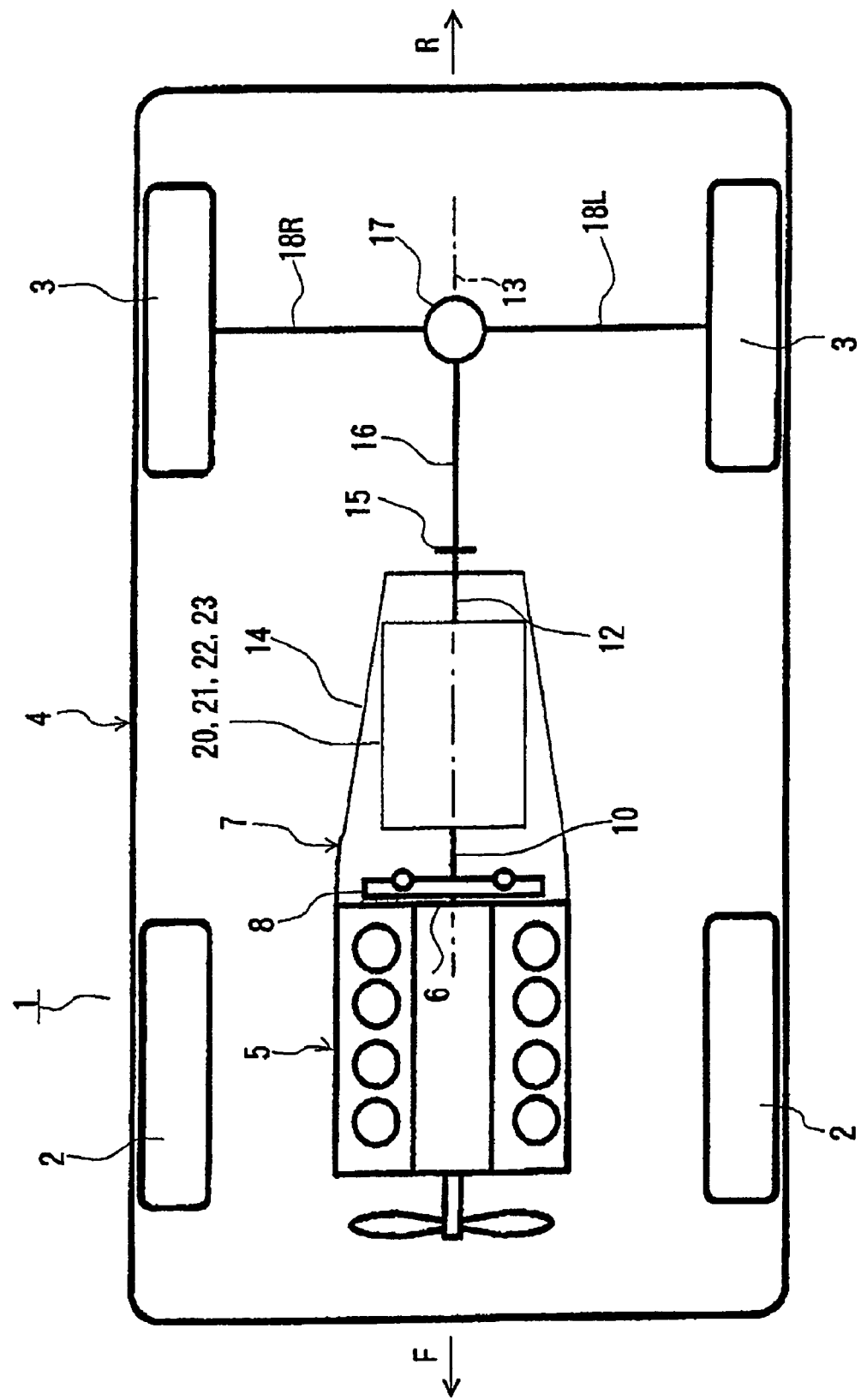
FIG. 1 is a plan view diagrammatically showing an inventive vehicle carrying an inventive hybrid driving unit.

Modes for carrying out the invention will be explained below with reference to the accompanying drawings. It is noted that the same reference numerals cited throughout several views denote the same components or effects and an overlapped explanation thereof will be omitted.

First Embodiment

FIG. 1 shows an exemplary inventive vehicle, i.e., a vehicle 1 carrying an inventive hybrid driving unit. The vehicle 1 shown in the figure is an FR (front-engine and rear-drive) type vehicle and FIG. 1 is a plan view diagrammatically showing the brief structure thereof. It is noted that in an actual vehicle, the direction indicated by an arrow F in the figure denotes the front side and the direction indicated by an arrow R denotes the rear side.

The vehicle 1 in the figure has a body 4 supported by right and left front wheels 2 and by right and left rear wheels 3, i.e., driving wheels. An internal combustion engine 5 is mounted in the front part of the body 4 through an intermediary of a rubber mount not shown in a manner of adjusting a crankshaft 6, i.e., its output shaft, in the longitudinal direction of the body. It is noted that in FIG. 1, the output shaft comprising a rear projection of the crankshaft is shown as the crankshaft 6. A hybrid driving unit 7 is coupled with the rear end of the internal combustion engine 5.

The hybrid driving unit 7 has an input shaft 10 connected to the crankshaft 6 of the internal combustion engine 5 via a damper unit 8, a first electric motor 20, a power splitting planetary gear 21, a transmission 22, a second electric motor 23 (see FIG. 2) and an output shaft 12 for outputting driving force. Here, the input shaft 10 and the output shaft 12 are disposed on one axis 13 such that the input shaft 10 comes on the front side and the output shaft 12, on the rear side. These input and output shafts 10 and 12 are disposed along the longitudinal direction of the body 4 and are stored in a casing member 14 which is lengthy in the longitudinal direction together with the first electric motor 20, the power splitting planetary gear 21, the transmission 22 and the second electric motor 23 described above. It is noted that the hybrid driving unit 7 will be described in detail later.

The output shaft 12 of the hybrid driving unit 7 projects from the rear end of the casing member 14 described above and extends further in the rear to be coupled with a differential unit 17 via a flexible coupling 15 and a publicly known propeller shaft 16 having a universal joint, a center bearing and others not shown. The differential unit 17 is coupled with the right and left rear wheels 3 described above via a left driving shaft 18L and a right driving shaft 18R.

In the vehicle 1 constructed as described above, motive power generated by the internal combustion engine 5 is inputted to the input shaft 10 of the hybrid driving unit 7 and is outputted from the output shaft 12 after being regulated by the first electric motor 20, the power splitting planetary gear 21, the transmission 22 and the second electric motor 23 described later. Then, the motive power thus regulated is transmitted to the right and left rear wheels 3, i.e., the driving wheels, via the propeller shaft 16 and others.

Next, a hybrid driving unit 7A of the present embodiment will be explained as one example of the inventive hybrid driving unit 7 mounted to the vehicle 1 shown in FIG. 1. The outline of the whole hybrid driving unit 7A will be explained at first with reference to the skeleton view in FIG. 2 and then its concrete structure will be detailed with reference to FIG. 3. It is noted that in these figures, the direction indicated by an arrow F denotes the front side of the body (the internal combustion engine side) and the direction indicated by an arrow R denotes the rear side of the body (the differential unit side).

Figure 2:
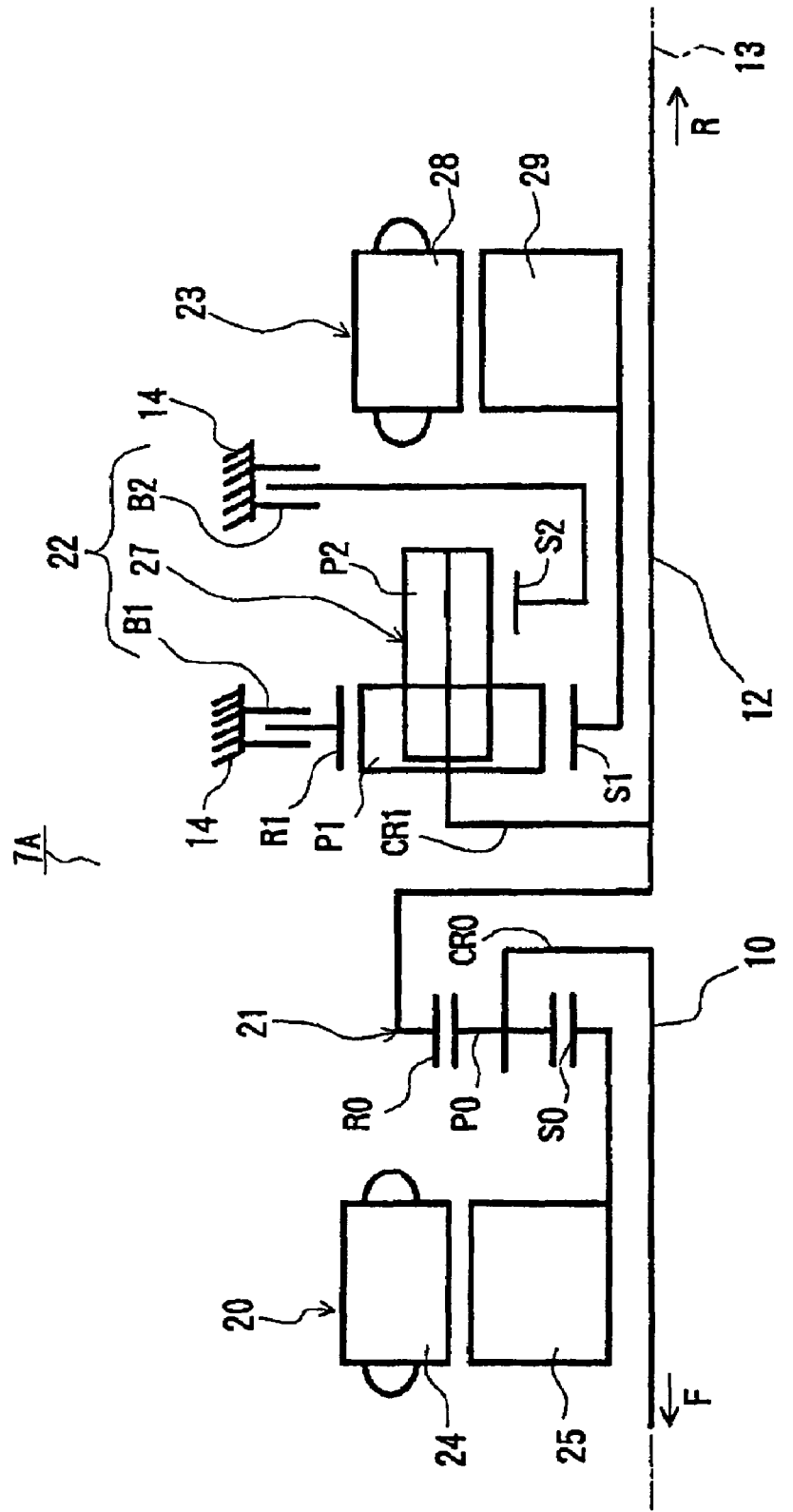
FIG. 2 is a skeleton view showing a hybrid driving unit of a first embodiment.

As shown in FIG. 2, the hybrid driving unit 7A comprises the first electric motor 20, the transmission 22, the power splitting planetary gear 21 and the second electric motor 23 in order from the side closer to the internal combustion engine 5 in FIG. 1, i.e., in order from the front side to the rear side. All of these are stored within the casing member 14 (see FIG. 1) and are disposed in line around the axis 13. These devices will be explained below in the order of the first electric motor 20 to the second electric motor 23.

The first electric motor 20 has a stator 24 fixed to the casing member 14 (see FIG. 1) and a rotor 25 rotatably supported on the inner diametric side of the stator 24 (as for the position in the radial direction of the casing member 14, the side closer to the center (the axis 13) will be referred to as the 'inner diametric side' and the side further from the center will be referred to as the 'outer diametric side' in the explanation hereinbelow). The rotor 25 of the first electric motor 20 is coupled with a sun gear S0 of the power splitting planetary gear 21 described next. The first electric motor 20 generates electricity based on the motive power inputted via the sun gear S0 and drives the second electric motor 23 or charges an HV battery (hybrid driving battery) not shown via an inverter not shown.

The power splitting planetary gear 21 comprises a single pinion planetary gear train disposed coaxially with the input shaft 10. The power splitting planetary gear 21 has a carrier (first rotary element) CR0 supporting a plurality of pinions P0, a sun gear (second rotary element) S0 and a ring gear (third rotary element) R0 each engaging with the pinions P0. The carrier CR0 of the power splitting planetary gear 21 is coupled with the input shaft 10, the sun gear S0 is coupled with the rotor 25 of the first electric motor 20 and the ring gear R0 is coupled with the output shaft 12. The power splitting planetary gear 21 splits the motive power inputted to the carrier CR0 via the input shaft 10 to the first electric motor 20 via the sun gear S0 and to the output shaft 12 via the ring gear R0 based on the control on the revolution of the first electric motor 20. It is noted that the power split to the first electric motor 20 is used for generating electricity and the power split to the output shaft 12 is used for driving the vehicle 1.

The transmission 22 has a so-called Ravigneaux type planetary gear unit 27 comprising one double pinion planetary gear train and a single planetary gear train that uses one of their pinions in common. The transmission 22 also has first and second brakes B1 and B2.

The planetary gear unit 27 comprises two sun gears S1 and S2, a carrier CR1 supporting a pinion P1 and a pinion (common long pinion) P2, and a ring gear R1. Between the two pinions P1 and P2, the pinion P1 engages with the sun gear S1 and the ring gear R1, and the pinion P2, i.e., the common long pinion, engages with the sun gear S2 and the pinion P1. The ring gear R1 of the planetary gear unit 27 is coupled with the first brake B1 and the sun gear S2 is coupled with the second brake B2. As a whole, the sun gear S1, which is an input member, is coupled with the rotor 29 of the second electric motor 23 described next, and the carrier CR1, which is an output member, is coupled with the output shaft 12 similarly to the ring gear R0 of the power splitting planetary gear 21 described above. This transmission 22 is arranged so as to be able to change two deceleration stages where reduction ratios are different by engaging one of the first and second brakes B1 and B2 while releasing the other and by releasing the one while engaging the other. That is, the transmission 22 is arranged so as to change the degree of the motive power inputted from the second electric motor 23 described above via the sun gear S1 and to transmit it to the output shaft 12 via the carrier CR1.

The second electric motor 23 is disposed at the rearmost position among the first electric motor 20, the power splitting planetary gear 21, the transmission 22 and the second electric motor 23 described above, i.e., at the position furthest from the internal combustion engine 5. The second electric motor 23 has a stator 28 fixed to the casing member 14 (see FIG. 1) and a rotor 29 rotatably supported on the inner diametric side of the stator 28. The rotor 29 of the second electric motor 23 is coupled with a sun gear S1 of the transmission 22 described above. Similarly to the first electric motor 20 described above, the second electric motor 23 is connected to the HV battery via the inverter. However, their main functions differ from each other. That is, differing from the first electric motor 20 which functions mainly for the purpose of power generation, the second electric motor 23 functions mainly as a driving motor for assisting the motive power (driving force) of the vehicle 1. However, the second electric motor 23 also functions as a generator in braking the vehicle for example by regenerating vehicular inertia force as electrical energy.

Among the first electric motor 20, the transmission 22, the power splitting planetary gear 21 and the second electric motor 23 described above, the first and second electric motors 20 and 23 are heavy devices which are heavier than the power splitting planetary gear 21 and the transmission 22. Then, in the present embodiment, the second electric motor 23, i.e., one of the heavy devices, is disposed at the rearmost position among the first electric motor 20, the power splitting planetary gear 21, the transmission 22 and the second electric motor 23, i.e., at the position furthest from the internal combustion engine 5 as shown in FIG. 2.

It is noted that the operation and effect of the hybrid driving unit 7A explained with reference to the skeleton view thereof in FIG. 2 will be explained after detailing the concrete structure of the hybrid driving unit 7A with reference to FIG. 3.

Figure 3:
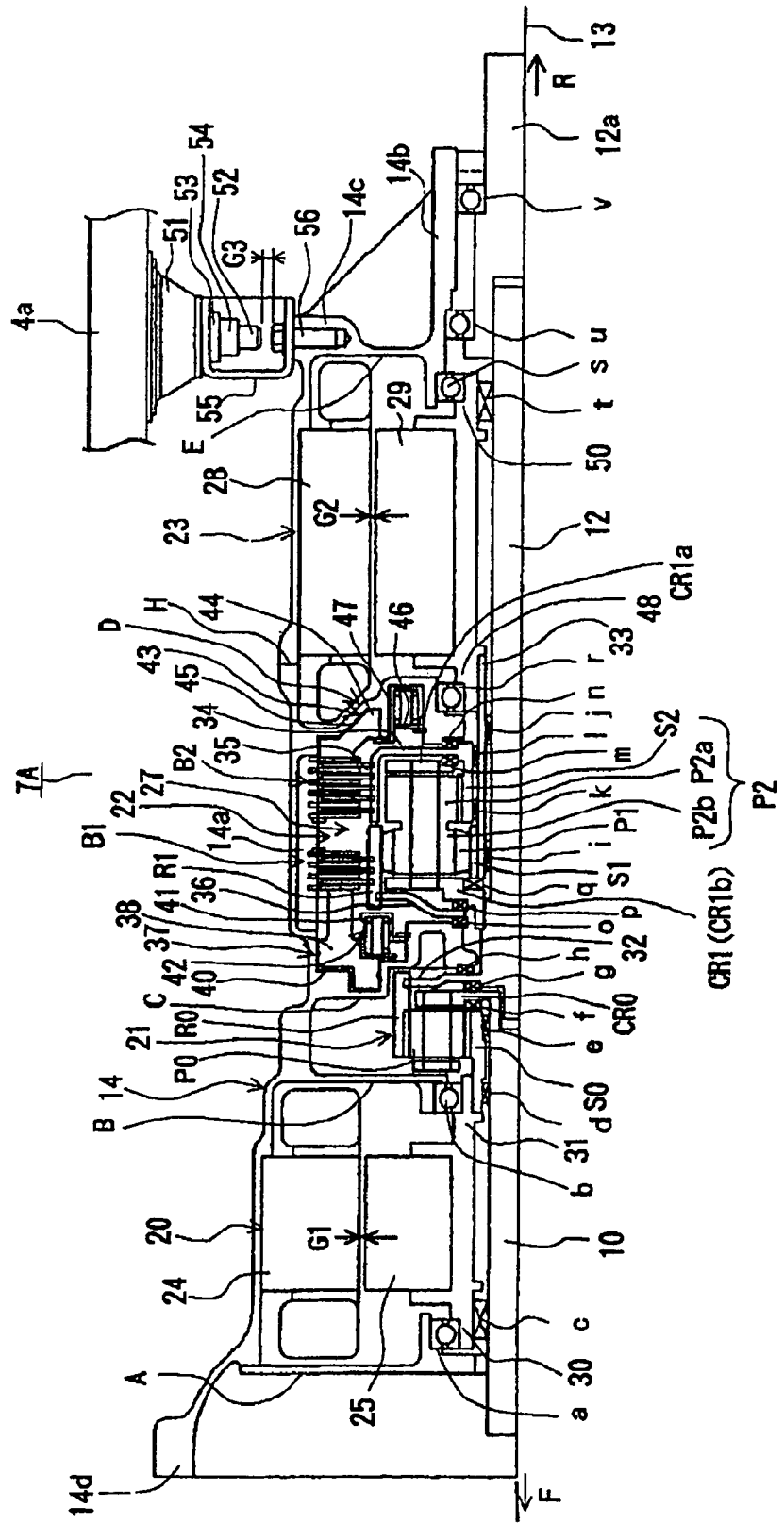
FIG. 3 is a longitudinal section view showing the structure of the hybrid driving unit of the first embodiment.

FIG. 3 shows an upper half portion of the longitudinal section view of the hybrid driving unit 7A including the axis 13.

The hybrid driving unit 7A shown in FIG. 3 comprises the input shaft 10 and the output shaft 12 disposed on the axis 13 and the first electric motor 20, the transmission 22, the power splitting planetary gear 21 and the second electric motor 23 disposed around the axis 13. All of these devices are stored within the casing member 14 together with the input shaft 10 and the output shaft 12, except of a part of the rear end of the output shaft 12 projecting out of the casing member 14 to the rear.

Taking the readiness of assembly and others into account, the casing member 14 is divided into a plurality of parts in the longitudinal direction along the axis 13 and is formed in a body by combining junctions of the respective parts. For instance, one of the junctions H is located near the front part of the second electric motor 23. Note that other junctions are not shown in the figure. In the casing member 14, a plurality of partitions, i.e., partitions A, B, C, D and E as supporting members, are formed at different positions in the longitudinal direction in order from the front side. Among these partitions A through E, the partitions A and E are disposed near the front and rear ends of the casing member 14, respectively, and the space within the case between the partitions A and E is divided into four spaces by the partitions B, C and D longitudinally along the axis 13. These partitions A through E act as reinforcing members of the casing member 14 and are used for retaining bearings a through v described later and for forming hydraulic chambers 40 and 45 described later.

The first electric motor 20, the transmission 22, the power splitting planetary gear 21 and the second electric motor 23 are stored within the four spaces divided by the partitions A through E, respectively. That is, the first electric motor 20 is stored in the space between the partitions A and B, the power splitting planetary gear 21 is stored between the portions C and D, and the second electric motor 23 is stored between the D and E, respectively. Beginning from the first electric motor 20, these devices will be explained in detail below.

The first electric motor 20 comprises a permanent magnet synchronous motor (brushless DC motor) for example. It is disposed on the outer diametric side of the input shaft 10 coaxially therewith. The first electric motor 20 has the stator 24 fixed to the inner peripheral face of the casing member 14 and the rotor 25 rotatably disposed on the inner diametric side of the stator 24 apart from the stator 24 by a predetermined air gap G1. The rotor 25 is formed into a cylindrical shape and stages 30 and 31 are formed at the front and rear outer peripheral faces of the cylindrical part. The casing member 14 rotatably supports the rotor 25 through an intermediary of bearings L and u fitted while being positioned in the longitudinal direction between these stages 30 and 31 and the partitions D and E. The sun gear S0 of the power splitting planetary gear 21 described later is fixed to the rear end of the cylindrical part. The rotor 25 supports the input shaft 10 through an intermediary of bearings c and d provided at the positions axially overlapping with bearings a and b, and the sun gear S0 is relatively-rotatably supported by the input shaft 10 through an intermediary of bearings d and e fixed on the outer peripheral face of the input shaft 10. A bearing e is disposed at the position corresponding to a gear section of the sun gear S0. Because the rotor 25 of the first electric motor 20 is rotatably supported by the casing member 14 through the intermediary of the bearings a and b fixed to the partitions A and B as described above, the longitudinal and radial directions of the rotor 25 may be assured accurately. Accordingly, even if a force bending the casing member 14 in the vertical or horizontal direction acts on the casing member 14, the predetermined air gap G1 between the stator 24 and the rotor 25 may be kept accurately. It is noted that the first electric motor 20 is connected to the HV battery via the inverter as described above. The main function of the first electric motor 20 constructed as described above is to generate electric power based on the power split to the sun gear S0 of the power splitting planetary gear 21 explained next and to drive the second electric motor 23 via the inverter or to charge the HV battery.

The power splitting planetary gear 21 is disposed between the partitions B and C of the casing member 14. The power splitting planetary gear 21 comprises the single pinion planetary gear train disposed coaxially with the input shaft 10 as described above and has the ring gear (second rotary element) S0, the carrier (first rotary element) CR0 supporting the pinions P0 and the sun gear (second rotary element) S0. Among them, the sun gear S0 extends to the front and is fixed to the rear end side of the rotor 25 of the first electric motor 20 described above. The carrier CR0 is fixed to the rear end of the input shaft 10, i.e., to the rear end of the input shaft 10 extending between the partitions B and C. The carrier CR0 is rotatably supported by bearings f and g fitted to the inner diametric front and rear faces thereof. The bearing f is interposed between the carrier and the rear end face of the sun gear S0 and the bearing r is interposed between the carrier and a flange portion 32 fixed on the front end side of the output shaft 12. The pinion P0 supported by the carrier CR0 is engaged with the sun gear S0 and the ring gear R0, respectively, on the inner and outer diametric sides. The ring gear R0 extends to the rear and is fixed to the outer diametric side of the flange portion 32 at the front end of the output shaft 12 described above. The inner diametric front and rear faces of the flange portion 32 are rotatably supported by the bearing g described above and a bearing h fixed to the inner diametric front face of the partition C. Thus, in the power splitting planetary gear 21, the carrier CR0, which is the input section, is fixed to the rear end of the input shaft 10 and the sun gear S0 and the ring gear R0, which are the output sections (to which power is split), are coupled with the rear end of the rotor 25 of the first electric motor 20 and to the front end of the output shaft 12, respectively. That is, the power splitting planetary gear 21 is arranged so as to split the power of the internal combustion engine 5 inputted to the carrier CR0 via the input shaft 10 (see FIG. 1) to the side of the first electric motor 20 via the sun gear S0 and to the side of the output shaft 12 via the ring gear R0. The ratio of split of power at this time is decided based on the state of revolution of the first electric motor 20. That is, when the rotor 25 of the first electric motor 20 is caused to generate a large power, an amount of power generated by the first electric motor 20 increases and the power outputted to the output shaft 12 is reduced to that extent. When the rotor 25 of the first electric motor 20 is caused to generate a small power in contrary, an amount of power generated by the first electric motor 20 decreases and the power outputted to the output shaft 12 increases to that extent.

The transmission 22 is disposed between the partitions C and D of the casing member 14, i.e., approximately at the intermediate position of the casing member 14 in the longitudinal direction (the direction along the axis 13). The transmission 22 has the Ravigneaux type planetary gear unit 27 disposed on the inner diametric side and first and second brakes B1 and B2 disposed, respectively, on the rear and front sides on the outer diametric side thereof.

The planetary gear unit 27 has a first sun gear S1 (hereinafter simply referred to as 'the sun gear S1') disposed near the outer peripheral face at the front end side of the output shaft 12, a second sun gear S2 (hereinafter simply referred to as 'the sun gear S2') disposed on the rear side of the sun gear S1 and slightly on the outer diametric side as compared to the sun gear S1, the ring gear R1 disposed on the outer diametric side of the sun gear S1, the pinion P1 engaging with the sun gear S1 and the ring gear R1, the pinion P2 composing the common long pinion and engaging with the sun gear S2 and the pinion P1, and the carrier CR1 supporting these pinions P1 and P2. Beginning from the sun gear S1, these parts will be explained below.

The sun gear S1 is coupled with the front end of the rotor 29 of the second electric motor 23 described later via a sleeve 33 fitted around the outer peripheral face of the front half of the output shaft 12. This sun gear S1 is relatively and rotatably supported by the input shaft 10, together with the sleeve 33, through an intermediary of the bearings i and j fitted to the outer peripheral face of the input shaft 10.

The sun gear S2 is formed in a body with a flange portion 34 extending from the rear end of the sun gear S2 to the outer diametric side along the rear carrier plate CR1a of the carrier CR1 and with a drum portion 35 extending to the front from the outer diametric end of the flange portion 34. The second brake B2 described later is interposed between the outer peripheral face of this drum portion 35 and an inner peripheral spline 14a of the inner peripheral face of the casing member 14. The sun gear S2 is rotatably supported by bearings k and l fitted to the outer peripheral face of the sleeve 33 formed in a body with the sun gear S1 described above and bearings m and n fitted, respectively, to the front and rear faces on the inner diametric side (basal end side) of the flange portion 34. It is noted that the bearing m is interposed between the flange portion 34 and the inner diametric rear face of the rear carrier plate CR1a of the carrier CR1 and the bearing n is interposed between the flange portion 34 and the front face of the inner diametric side of the partition D.

The ring gear R1 is provided with a flange portion 36 fixed at the forefront thereof and extending to the inner diametric side along the front carrier plate CR1b of the carrier CR1 and is rotatably supported by bearings o and p fitted to the front and rear faces on the inner diametric side of the flange portion 36. The bearing o is interposed between the flange portion 36 and the inner diametric rear face of the partition C and the bearing p is interposed between the flange portion 36 and the front carrier plate CR1a of the carrier CR1. The first brake B1 is interposed between the outer peripheral face of the ring gear R1 and the inner peripheral spline 14a of the inner peripheral face of the casing member 14.

The pinion P1 is rotatably supported by the carrier CR1 and is engaged with the sun gear S1 described above on the inner diametric side and with the ring gear R1 described above on the outer diametric side.

The pinion P2 is the common long pinion in which a large-diametric gear P2a formed on the rear side and a small-diametric gear P2b formed on the front side are combined in a body. In the pinion P2, the large-diametric gear P2a is engaged with the sun gear S2 described above and the small-diametric gear P2b is engaged with the pinion P1 described above.

The carrier CR1 rotatably supports the pinions P1 and P2 by the front and rear carrier plates CR1b and CR1a. The front carrier plate CR1b is coupled with the outer peripheral face on the front end of the output shaft 12. The carrier CR1 is relatively and rotatably supported by the bearing p fitted to the inner diametric front and rear faces of the front carrier plate CR1b and the bearing m fitted to the inner diametric front face of the rear carrier plate CR1a.

The first brake B1 has a number of discs and friction plates (brake plates) and is spline-coupled between an outer peripheral spline formed on the outer peripheral face of the ring gear R1 described above and the inner spline 14a formed on the inner peripheral face of the casing member 14. A hydraulic actuator 37 for the first brake is disposed on the front side of the first brake B1. The hydraulic actuator 37 has a piston 38 disposed on the front side of the first brake B1 so as to be movable in the longitudinal direction, a first hydraulic chamber 40 which is provided at the outer diametric front face of the partition C and into which the front end of the piston 38 is oil-tightly fitted, and a return spring (compression spring) 42 interposed between a retainer 41 fixed to the partition C and the inner diametric rear face of the piston 38 to bias the piston 38 to the front.

The second brake B2 is disposed just behind the first brake B1 described above. The second brake B2 has a number of discs and friction plates (brake plates) and is spline-coupled between an outer peripheral spline formed on the outer peripheral face of the drum portion 35 combined with the sun gear S2 described above and the inner spline 14a formed on the inner peripheral face of the casing member 14. A hydraulic actuator 43 for the second brake is disposed on the rear side of the second brake B2. The hydraulic actuator 43 has a piston 44 disposed behind the second brake B2 so as to be movable in the longitudinal direction, a second hydraulic chamber 45 which is provided at the outer diametric rear face of the partition D and into which the rear end of the piston 44 is oil-tightly fitted, and a return spring (compression spring) 47 interposed between a retainer 46 fixed to the partition D and the inner diametric front face of the piston 44 to bias the piston 44 to the rear.

In the transmission 22 constructed as described above, an output from the second electric motor 23 is transmitted to the sun gear S1 via the sleeve 63. In a low state, the first brake B1 is engaged and the second brake B2 is released. Accordingly, the ring gear R1 is locked and the sun gear S2 is freely rotatable in this state. The revolution of the sun gear S1 described above is extensively reduced via the pinion P1 and is transmitted to the carrier CR1. The revolution of the carrier CR1 is then transmitted to the output shaft 12.

When the transmission 22 is in a high state, the first brake B1 is released and the second brake B2 is engaged. Accordingly, the sun gear S2 is locked and the ring gear R1 is freely rotatable in this state. In this state, the revolution of the sun gear S1 is transmitted to the pinion P1 and the pinion P2 engages with the locked sun gear S2. Then, the carrier CR1 moves around the sun gear at a restricted predetermined number of revolution and the revolution of the carrier CR1 reduced in a relatively small extent is transmitted to the output shaft 12 at this time.

Thus, the transmission 22 transmits the extensively reduced revolution to the output shaft 12 in the low state by engaging the first brake B1 and by releasing the second brake B2, respectively. In contrary, it transmits the revolution reduced in a relatively small extent to the output shaft 12 by releasing the first brake B1 and by engaging the second brake B2, respectively. Because the transmission 22 is thus capable of shifting in the two stages, the second electric motor 23 may be downsized. That is, the transmission 22 enables to use a small electric motor, to transmit sufficient driving torque to the output shaft 12 in the low state in starting the vehicle 1 when high torque is required, and to prevent the rotor 29 from rotating at high-speed by putting it in the high state when the output shaft 12 is rotating at high-speed.

The second electric motor 23 comprises a permanent magnet synchronous motor (brushless DC motor) for example and is disposed on the outer diametric side of the output shaft 12 coaxially therewith. The second electric motor 23 has the stator 28 fixed to the inner peripheral face of the casing member 14 and the rotor 29 rotatably disposed on the inner diametric side of the stator 28 apart from the stator 28 by a predetermined air gap G2. The inner diametric side of the rotor 29 is formed in a cylindrical shape and stages 48 and 50 are formed, respectively, at the front and rear outer peripheral faces of the cylindrical part. The casing member 14 rotatably supports the rotor 29 through an intermediary of bearings r and s fitted between the stages 48 and 50 and the partitions D and E while being positioned in the longitudinal direction. A sleeve 33 formed in a body with the sun gear S1 of the transmission 22 described above is fixed at the front end of the cylindrical part. The output shaft 12 relatively and rotatably supports the rotor 29 and the sun gear S1 mutually formed in a body through an intermediary of bearings i, j and t fixed on the outer peripheral face of the output shaft 12. It is noted that the bearings j and t are disposed at the positions corresponding to the bearings r and s in terms of disposition in the longitudinal direction. Since the rotor 29 of the second electric motor 23 is rotatably supported so as to be sandwiched by the casing member 14 and the output shaft 12 through the intermediary of the bearings r and s fixed to the partitions D and E and the bearings j and t fixed to the outer peripheral face of the output shaft 12 as described above, the longitudinal and radial positions of the rotor 29 may be maintained accurately. Accordingly, even if a force that may bend the casing member 14 in the vertical or lateral direction acts thereon, the predetermined air gap G2 between the stator 28 and the rotor 29 may be kept accurately. It is noted that the second electric motor 23 is connected to the HV battery via the inverter similarly to the first electric motor 20 as described above.

The casing member 14 storing the first electric motor 20, the power splitting planetary gear 21, the transmission 22 and the second electric motor 23 as described above has a boss section 14b which extends to the rear on the inner diametric side of the partition E at the rear end thereof. The casing member 14 rotatably supports a rear end coupling section 12a of the output shaft 12 by the boss section 14b through an intermediary of bearings u and v.

The outer diametric side of the partition E of the casing member 14 is thickened to compose a mounting section 14c. A coupling section 14d at the front end of the casing member 14 is connected with the internal combustion engine 5 rubber-mounted to the body 4 (see FIG. 1) and the rear end thereof is rubber-mounted to a part 4a of the body by utilizing the mounting section 14c. That is, the part 4a of the body is provided with a rubber pedestal 51 to which a stay 55 is fixed by a bolt 52, a washer 53 and a nut 54. Then, the casing member 14 is mounted to the stay 55 described above by a bolt 56 screwed to the mounting section 14c near the rear end of the casing member 14. It is noted that because the casing member 14 is arranged so that the a gap G3 between the bolt 52 on the part 4a side and the bolt 56 on the casing member 14 side is shorter than a screwing length of the bolt 56, the bolt 56 will not come out of the mounting section 14c and thus the rear end of the casing member 14 will not be put out of the body part 4a even if the bolt 56 is happened to be loosened.

Since the partitions D and E as the supporting members extending from the casing member 14 support the both sides of the rotor 29 of the second electric motor 23 through the intermediary of the bearings r and s as described above and the accuracy for supporting the rotor 29 is improved, the gap between the stator 28 and the rotor 29 may be reduced. Thereby, the output of the second electric motor 23 may be improved. Still more, since the mounting section 14c is provided at the position axially overlapping with the rear partition E among the two partitions D and E and the rigidity for supporting the rotor 29 may be improved, it becomes possible to suppress the vibration occurring in the casing member 14 and to reduce the vibration propagating from the casing member 14 to the body 4.

Next, a first modification of the hybrid driving unit 7A of the present embodiment will be explained with reference to a skeleton view in FIG. 4.

Figure 4:
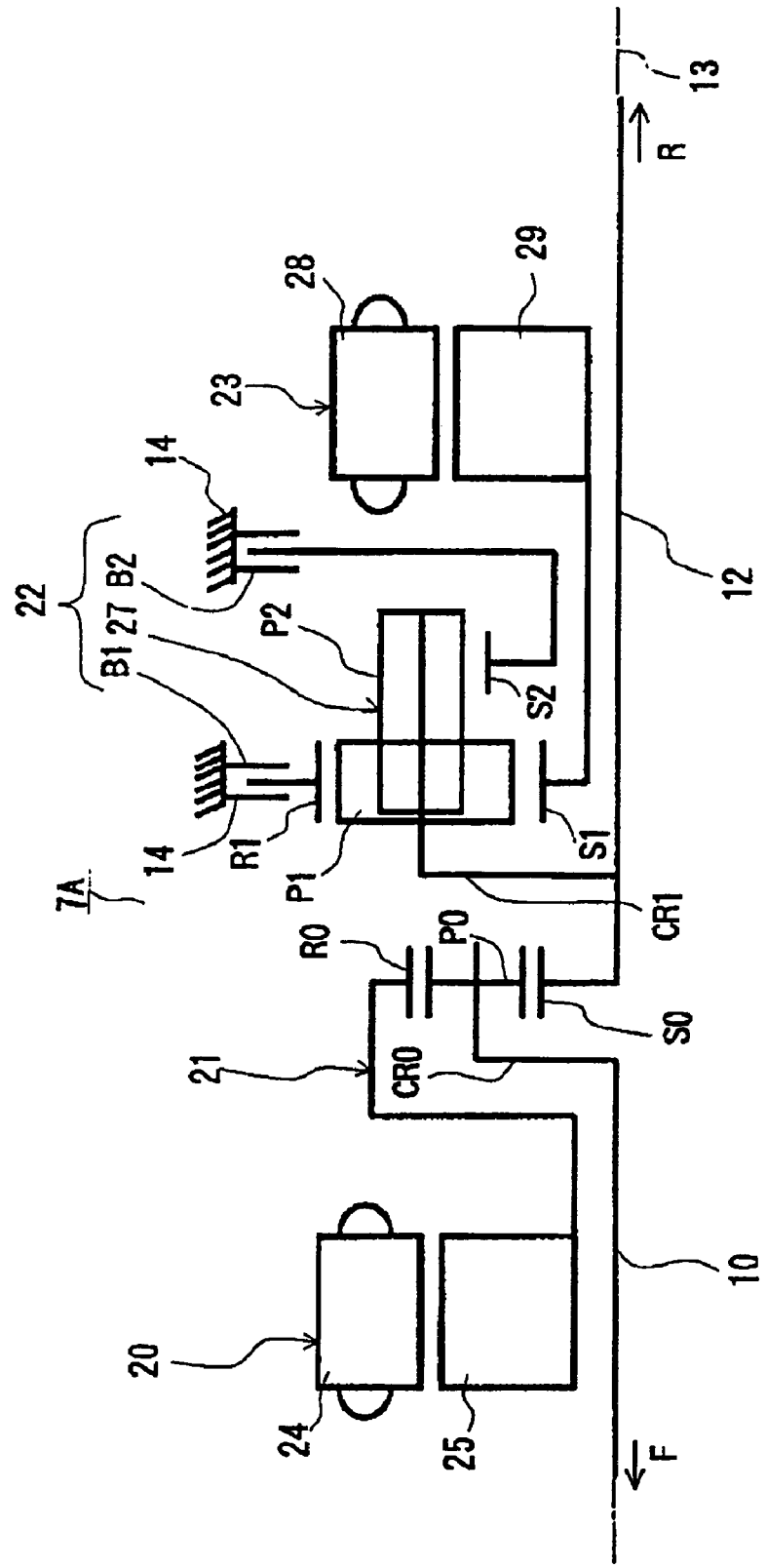
FIG. 4 is a skeleton view showing a first modification of the hybrid driving unit of the first embodiment.

As shown in FIG. 4, the hybrid driving unit 7A comprises the first electric motor 20, the power splitting planetary gear 21, the transmission 22 and the second electric motor 23 in order from the side closer to the internal combustion engine 5 in FIG. 1, i.e., in order from the front side to the rear side. All of these are stored within the casing member 14 (see FIG. 1) and are disposed in line around the axis 13. These devices will be explained below in the order of the first electric motor 20 to the second electric motor 23.

The first electric motor 20 has the stator 24 fixed to the casing member 14 (see FIG. 1) and the rotor 25 rotatably supported on the inner diametric side of the stator 24. The rotor 25 of the first electric motor 20 is coupled with a ring gear R0 of the power splitting planetary gear 21 described next. The first electric motor 20 generates electricity based on the motive power inputted via the sun gear S0 and drives the second electric motor 23 or charges the HV battery (hybrid driving battery) not shown via the inverter not shown.

The power splitting planetary gear 21 comprises a single pinion planetary gear train disposed coaxially with the output shaft 12. The power splitting planetary gear 21 has the carrier (first rotary element) CR0 supporting a plurality of pinions P0, the sun gear (third rotary element) S0 and the ring gear (second rotary element) R0 each engaging with the pinions P0. The carrier CR0 of the power splitting planetary gear 21 is coupled with the input shaft 10, the ring gear R0 is coupled with the rotor 25 of the first electric motor 20 and the sun gear S0 is coupled with the output shaft 12. The power splitting planetary gear 21 splits the motive power inputted to the carrier CR0 via the input shaft 10 to the first electric motor 20 via the ring gear R0 and to the output shaft 12 via the sun gear S0 based on the control on the revolution of the first electric motor 20. It is noted that the power split to the first electric motor 20 is used for generating electricity and the power split to the output shaft 12 is used for driving the vehicle 1.

The transmission 22 has the so-called Ravigneaux type planetary gear unit 27 comprising one double pinion planetary gear train and a single planetary gear train that uses one of their pinions in common. The transmission 22 also has the first and second brakes B1 and B2.

The planetary gear unit 27 comprises two sun gears S1 and S2, the carrier CR1 supporting the pinion P1 and the pinion (common long pinion) P2, and the ring gear R1. Between the two pinions P1 and P2, the pinion P1 engages with the sun gear S1 and the ring gear R1, and the pinion P2, i.e., the common long pinion, engages with the sun gear S2 and the pinion P1. The ring gear R1 of the planetary gear unit 27 is coupled with the first brake B1 and the sun gear S2 is coupled with the second brake B2. As a whole, the sun gear S1, which is an input member, is coupled with the rotor 29 of the second electric motor 23 described next, and the carrier CR1, which is an output member, is coupled with the output shaft 12 similarly to the sun gear S0 of the power splitting planetary gear 21 described above. This transmission 22 is arranged so as to be able to change two deceleration stages where reduction ratios are different by engaging one of the first and second brakes B1 and B2 while releasing the other and by releasing the one while engaging the other. That is, the transmission 22 is arranged so as to change the degree of the motive power inputted from the second electric motor 23 described above via the sun gear S1 and to transmit it to the output shaft 12 via the carrier CR1.

The second electric motor 23 is disposed at the rearmost position among the first electric motor 20, the power splitting planetary gear 21, and the transmission 22 and the second electric motor 23 described above, i.e., at the position furthest from the internal combustion engine 5. The second electric motor 23 has the stator 28 fixed to the casing member 14 (see FIG. 1) and the rotor 29 rotatably supported on the inner diametric side of the stator 28. The rotor 29 of the second electric motor 23 is coupled with the sun gear S1 of the transmission 22 described above. Similarly to the first electric motor 20 described above, the second electric motor 23 is connected to the HV battery via the inverter. The second electric motor 23 is arranged to assist the drive of the output shaft 12 via the transmission 22 and to regenerate energy.

Next, a second modification of the hybrid driving unit 7A of the present embodiment will be explained with reference to a skeleton view in FIG. 5.

Figure 5:
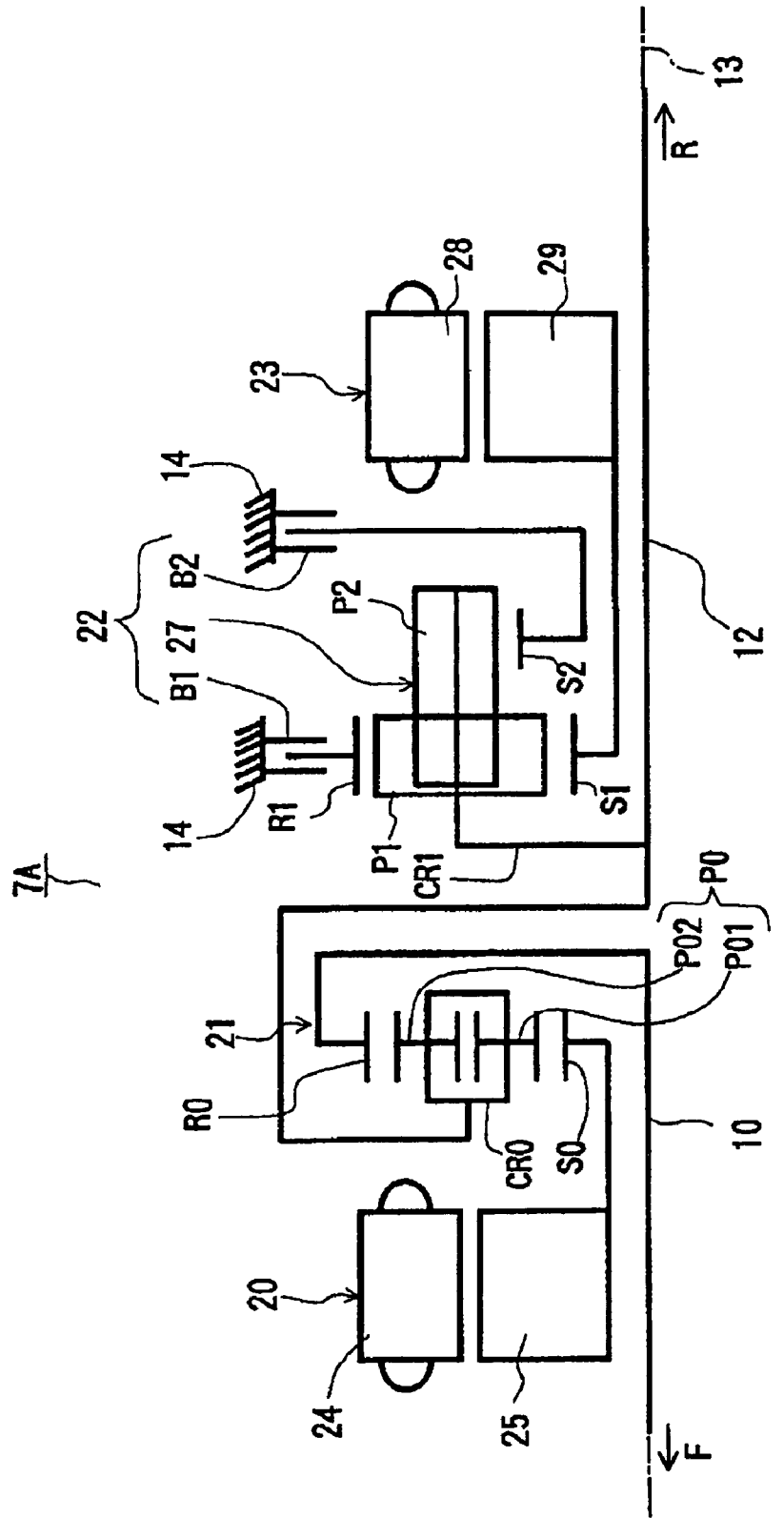
FIG. 5 is a skeleton view showing a second modification of the hybrid driving unit of the first embodiment.

As shown in FIG. 5, the hybrid driving unit 7A comprises the first electric motor 20, the power splitting planetary gear 21, the transmission 22 and the second electric motor 23 in order from the side closer to the internal combustion engine 5 in FIG. 1, i.e., in order from the front side to the rear side. All of these are stored within the casing member 14 (see FIG. 1) and are disposed in line around the axis 13. These devices will be explained below in the order of the first electric motor 20 to the second electric motor 23.

The first electric motor 20 has the stator 24 fixed to the casing member 14 (see FIG. 1) and the rotor 25 rotatably supported on the inner diametric side of the stator 24. The rotor 25 of the first electric motor 20 is coupled with a sun gear S0 of the power splitting planetary gear 21 described next. The first electric motor 20 mainly generates electricity based on the motive power inputted via the sun gear S0 and drives the second electric motor 23 or charges the HV battery (hybrid driving battery) not shown via the inverter not shown.

The power splitting planetary gear 21 comprises a double pinion planetary gear train disposed coaxially with the input shaft 10. The power splitting planetary gear 21 has the carrier (first rotary element) CR0 supporting the plurality of pinions P0 (P01 and P02), the sun gear (second rotary element) S0 and the ring gear (third rotary element) R0 each engaging with the pinions P01 and P02. The ring gear R0 of the power splitting planetary gear 21 is coupled with the input shaft 10, the sun gear S0 is coupled with the rotor 25 of the first electric motor 20 and the carrier CR0 is coupled with the output shaft 12. The power splitting planetary gear 21 splits the motive power inputted to the ring gear R0 via the input shaft 10 to the first electric motor 20 via the sun gear S0 and to the output shaft 12 via the carrier CR0 based on the control on the revolution of the first electric motor 20. It is noted that the power split to the first electric motor 20 is used for generating electricity and the power split to the output shaft 12 is used for driving the vehicle 1.

The transmission 22 has the so-called Ravigneaux type planetary gear unit 27 comprising one double pinion planetary gear train and a single planetary gear train that uses one of their pinions in common. The transmission 22 also has the first and second brakes B1 and B2.

The planetary gear unit 27 comprises two sun gears S1 and S2, the carrier CR1 supporting the pinion P1 and the pinion (common long pinion) P2, and the ring gear R1. Between the two pinions P1 and P2, the pinion P1 engages with the sun gear S1 and the ring gear R1, and the pinion P2, i.e., the common long pinion, engages with the sun gear S2 and the pinion P1. The ring gear R1 of the planetary gear unit 27 is coupled with the first brake B1 and the sun gear S2 is coupled with the second brake B2. As a whole, the sun gear S1, which is an input member, is coupled with the rotor 29 of the second electric motor 23 described next, and the carrier CR1, which is an output member, is coupled with the output shaft 12 similarly to the carrier CR0 of the power splitting planetary gear 21 described above. This transmission 22 is arranged so as to be able to change two deceleration stages where reduction ratios are different by engaging one of the first and second brakes B1 and B2 while releasing the other and by releasing the one while engaging the other. That is, the transmission 22 is arranged so as to change the degree of the motive power inputted from the second electric motor 23 described above via the sun gear S1 and to transmit it to the output shaft 12 via the carrier CR1.

The second electric motor 23 is disposed at the rearmost position with respect to the first electric motor 20, the power splitting planetary gear 21, and the transmission 22, i.e., at the position furthest from the internal combustion engine 5. The second electric motor 23 has the stator 28 fixed to the casing member 14 (see FIG. 1) and the rotor 29 rotatably supported on the inner diametric side of the stator 28. The rotor 29 of the second electric motor 23 is coupled with the sun gear S1 of the transmission 22 described above. Similarly to the first electric motor 20 described above, the second electric motor 23 is connected to the HV battery via the inverter. The second electric motor 23 is arranged to assist the drive of the output shaft 12 via the transmission 22 and to regenerate energy.

Next, a third modification of the hybrid driving unit 7A of the present embodiment will be explained with reference to a skeleton view in FIG. 6.

Figure 6:
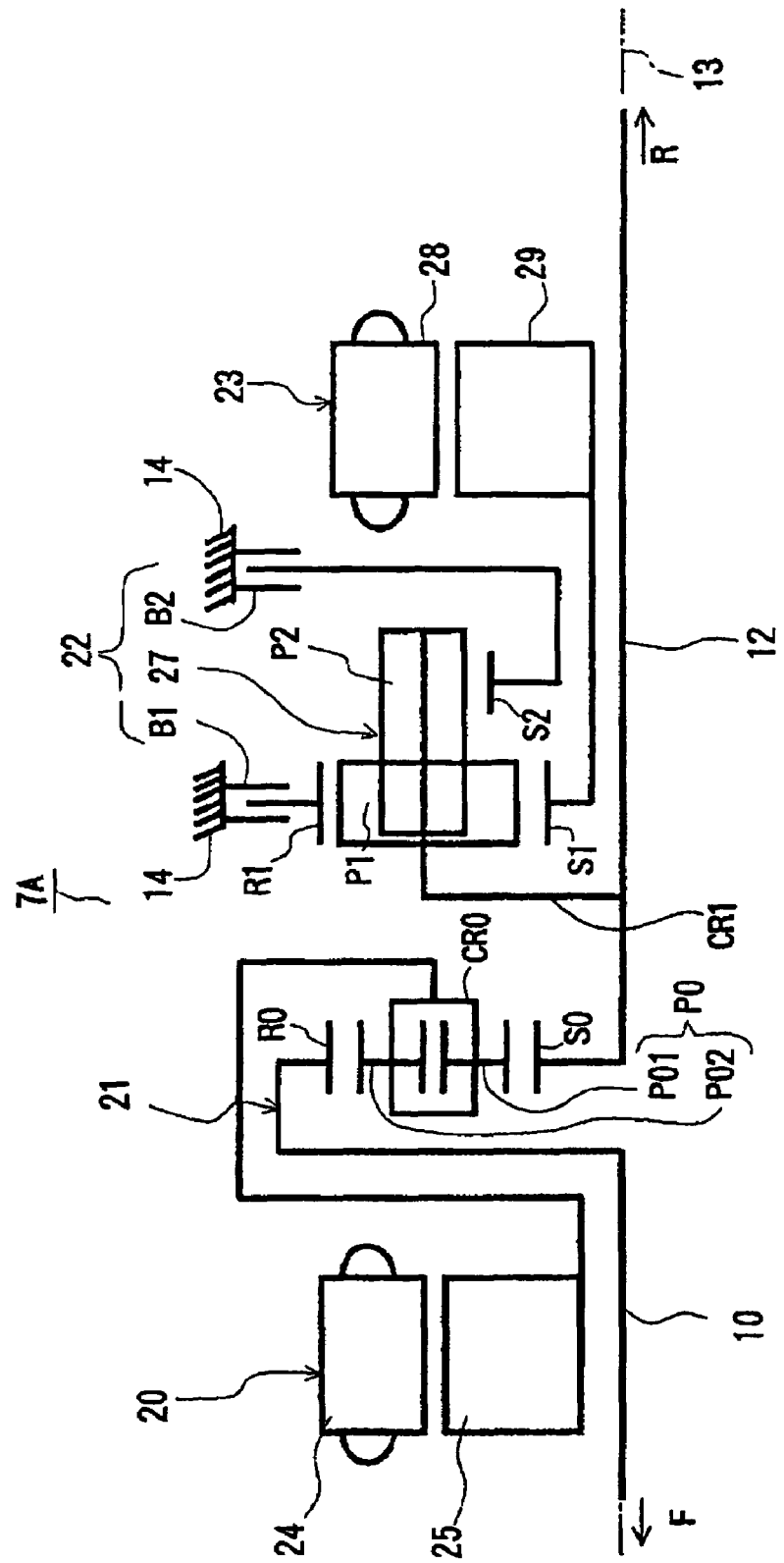
FIG. 6 is a skeleton view showing a third modification of the hybrid driving unit of the first embodiment.

As shown in FIG. 6, the hybrid driving unit 7A comprises the first electric motor 20, the power splitting planetary gear 21, the transmission 22 and the second electric motor 23 in order from the side closer to the internal combustion engine 5 in FIG. 1, i.e., in order from the front side to the rear side. All of these are stored within the casing member 14 (see FIG. 1) and are disposed in line around the axis 13. These devices will be explained below in the order of the first electric motor 20 to the second electric motor 23.

The first electric motor 20 has the stator 24 fixed to the casing member 14 (see FIG. 1) and the rotor 25 rotatably supported on the inner diametric side of the stator 24. The rotor 25 of the first electric motor 20 is coupled with the carrier CR0 of the power splitting planetary gear 21 described next. The first electric motor 20 mainly generates electricity based on the motive power inputted via the carrier CR0 and drives the second electric motor 23 or charges the HV battery (hybrid driving battery) not shown via the inverter not shown.

The power splitting planetary gear 21 comprises a double pinion planetary gear train disposed coaxially with the input shaft 10. The power splitting planetary gear 21 has the carrier (second rotary element) CR0 supporting the plurality of pinions P0 (P01 and P02), the sun gear (third rotary element) S0 and the ring gear (first rotary element) R0 each engaging with the pinions P01 and P02. The ring gear R0 of the power splitting planetary gear 21 is coupled with the input shaft 10, the carrier CR0 is coupled with the rotor 25 of the first electric motor 20 and the sun gear S0 is coupled with the output shaft 12. The power splitting planetary gear 21 splits the motive power inputted to the ring gear R0 via the input shaft 10 to the first electric motor 20 via the carrier CR0 and to the output shaft 12 via the sun gear S0 based on the control on the revolution of the first electric motor 20. It is noted that the power split to the first electric motor 20 is used for generating electricity and the power split to the output shaft 12 is used for driving the vehicle 1.

The transmission 22 has the so-called Ravigneaux type planetary gear unit 27 comprising one double pinion planetary gear train and a single planetary gear train that uses one of their pinions in common. The transmission 22 also has the first and second brakes B1 and B2.

The planetary gear unit 27 comprises two sun gears S1 and S2, the carrier CR1 supporting the pinion P1 and the pinion (common long pinion) P2, and the ring gear R1. Between the two pinions P1 and P2, the pinion P1 engages with the sun gear S1 and the ring gear R1, and the pinion P2, i.e., the common long pinion, engages with the sun gear S2 and the pinion P1. The ring gear R1 of the planetary gear unit 27 is coupled with the first brake B1 and the sun gear S2 is coupled with the second brake B2. As a whole, the sun gear S1, which is an input member, is coupled with the rotor 29 of the second electric motor 23 described next, and the carrier CR1, which is an output member, is coupled with the output shaft 12 similarly to the sun gear S0 of the power splitting planetary gear 21 described above. This transmission 22 is arranged so as to be able to change two deceleration stages where reduction ratios are different by engaging one of the first and second brakes B1 and B2 while releasing the other and by releasing the one while engaging the other. That is, the transmission 22 is arranged so as to change the degree of the motive power inputted from the second electric motor 23 described above via the carrier CR1 and to transmit it to the output shaft 12 via the carrier CR1.

The second electric motor 23 is disposed at the rearmost position among the first electric motor 20, the power splitting planetary gear 21, the transmission 22 and the second electric motor 23 described above, i.e., at the position furthest from the internal combustion engine 5. The second electric motor 23 has the stator 28 fixed to the casing member 14 (see FIG. 1) and the rotor 29 rotatably supported on the inner diametric side of the stator 28. The rotor 29 of the second electric motor 23 is coupled with the sun gear S1 of the transmission 22 described above. Similarly to the first electric motor 20 described above, the second electric motor 23 is connected to the HV battery via the inverter. The second electric motor 23 is arranged to assist the drive of the output shaft 12 via the transmission 22 and to regenerate energy.

Second Embodiment

Next, a hybrid driving unit 7B of a second embodiment will be explained as another example of the inventive hybrid driving unit 7 mounted to the vehicle 1 shown in FIG. 1. The outline of the whole hybrid driving unit 7B will be explained at first with reference to the skeleton view in FIG. 7 and then its concrete structure will be detailed with reference to FIG. 8. It is noted that in these figures, the direction indicated by an arrow F denotes the front side of a body (the internal combustion engine side) and the direction indicated by an arrow R denotes the rear side thereof (the differential unit side).

Figure 7:
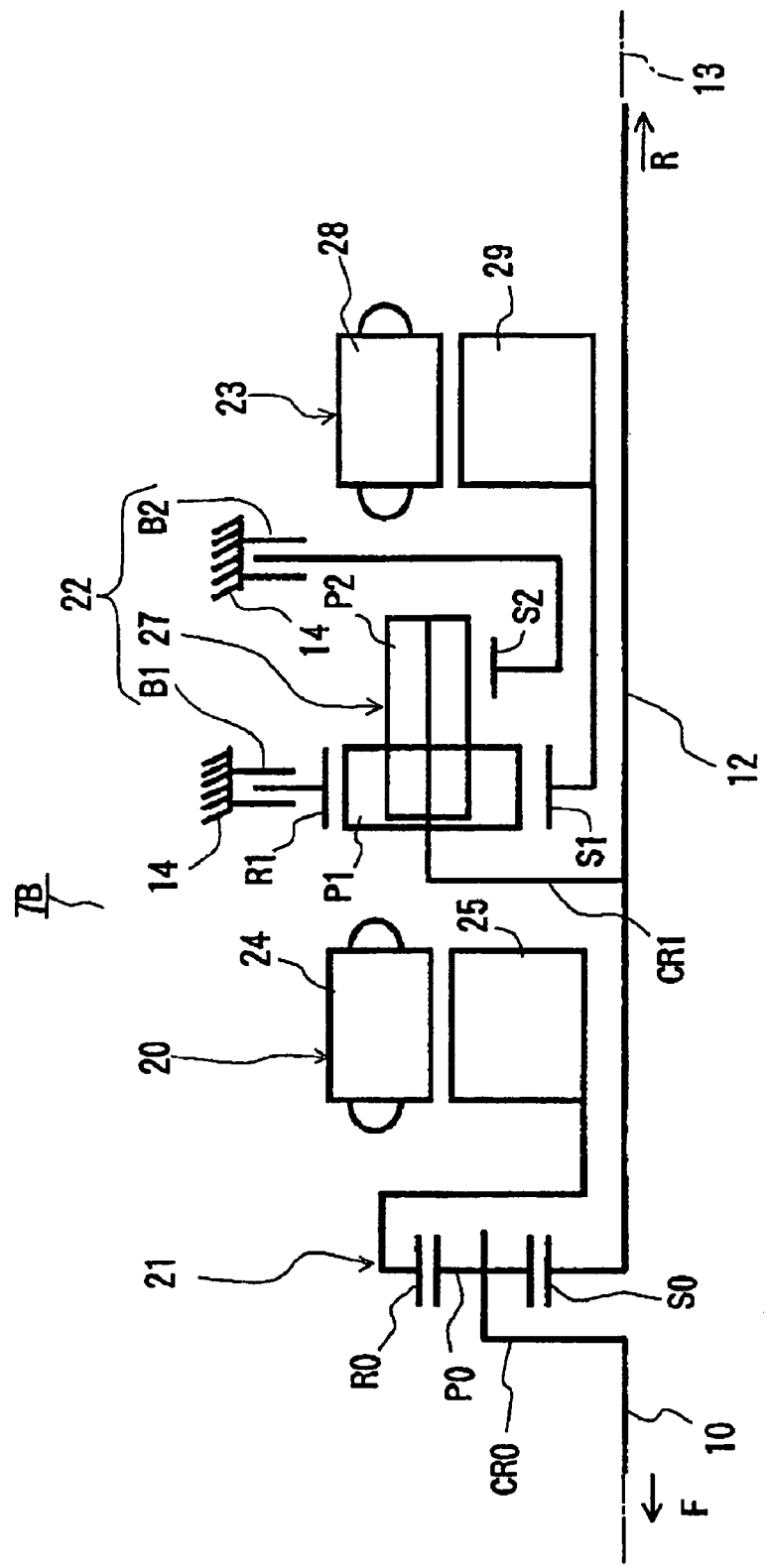
FIG. 7 is a skeleton view showing a hybrid driving unit of a second embodiment.
Figure 8:
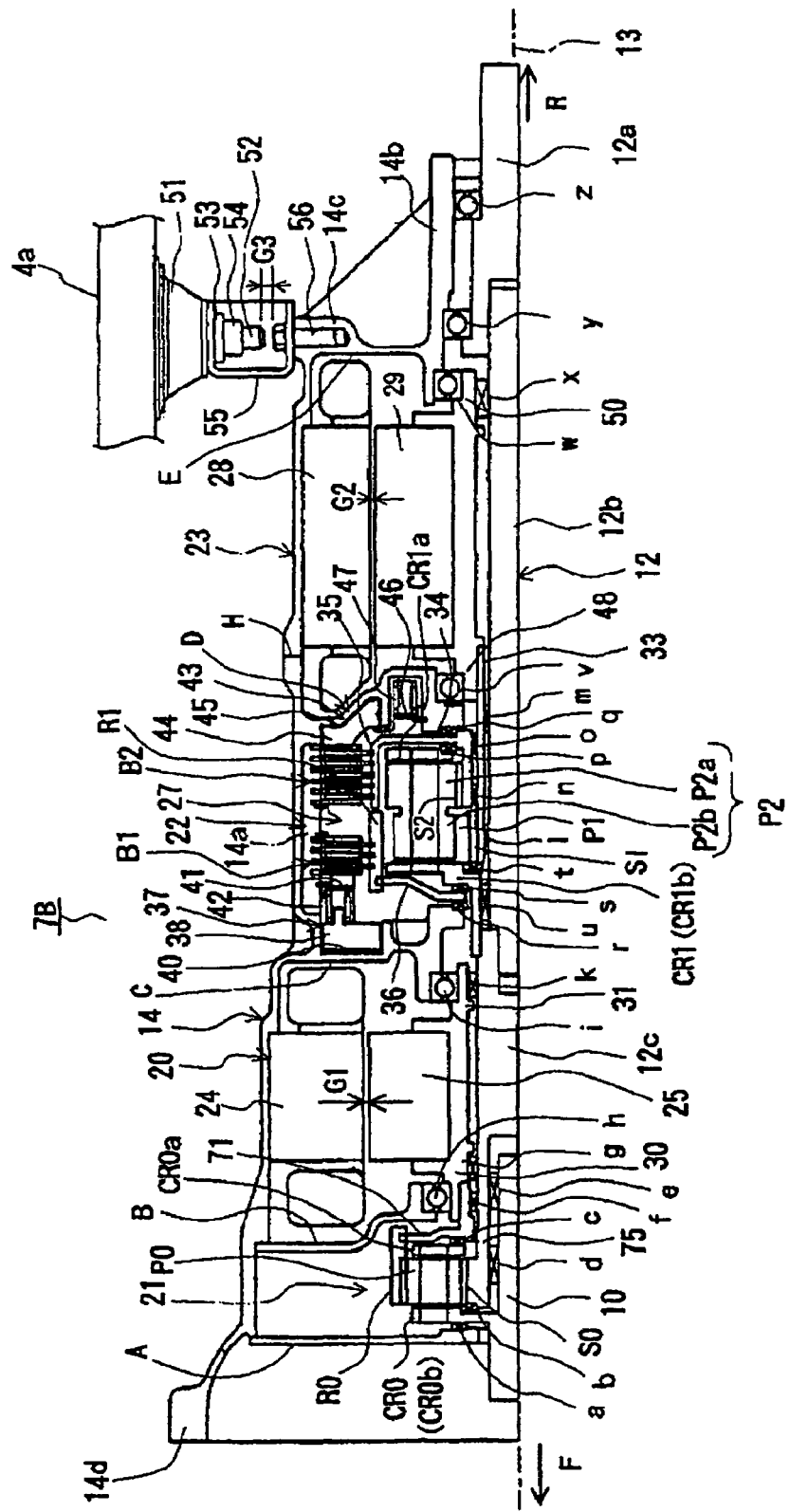
FIG. 8 is a longitudinal section view showing the structure of the hybrid driving unit of the second embodiment.

As shown in FIG. 7, the hybrid driving unit 7B comprises the power splitting planetary gear 21, the first electric motor 20, the transmission 22 and the second electric motor 23 in order from the side closer to the internal combustion engine 5 in FIG. 1, i.e., in order from the front side to the rear side. All of these are stored within the casing member 14 (see FIG. 1) and are disposed in line around the axis 13. It is noted that in the present embodiment, the output shaft 12 is composed of a front end coupling section 12c, an intermediate coupling section 12b and a rear end coupling section 12a formed in a body as shown in FIG. 8. These devices will be explained below in the order of the power splitting planetary gear 21, the first electric motor 20, the transmission 22 and the second electric motor 23.

The power splitting planetary gear 21 comprises a single pinion planetary gear train disposed coaxially with the input shaft 10. The power splitting planetary gear 21 has the carrier (first rotary element) CR0 supporting a plurality of pinions P0, the sun gear (third rotary element) S0 and the ring gear (second rotary element) R0 each engaging with the pinions P0. The carrier CR0 of the power splitting planetary gear 21 is coupled with the input shaft 10, the ring gear R0 is coupled with the rotor 25 of the first electric motor 20 and the sun gear S0 is coupled with the output shaft 12. The power splitting planetary gear 21 constructed as described above splits the motive power inputted to the carrier CR0 via the input shaft 10 to the first electric motor 20 via the ring gear R0 and to the output shaft 12 via the sun gear R0 based on the control on the revolution of the first electric motor 20. It is noted that the power split to the first electric motor 20 is used for generating electricity and the power split to the output shaft 12 is used for driving the vehicle 1.

The first electric motor 20 has the stator 24 fixed to the casing member 14 (see FIG. 1) and the rotor 25 rotatably supported on the inner diametric side of the stator 24. The rotor 25 of the first electric motor 20 is coupled with the ring gear R0 of the power splitting planetary gear 21 described above. The first electric motor 20 constructed as described above mainly generates electricity based on the motive power inputted via the ring gear R0 and drives the second electric motor 23 or charges the HV battery (hybrid driving battery) not shown via the inverter not shown.

The transmission 22 has the so-called Ravigneaux type planetary gear unit 27 comprising one double pinion planetary gear train and the single planetary gear train that uses one of their pinions in common. The transmission 22 also has the first and second brakes B1 and B2.

The planetary gear unit 27 comprises two sun gears S1 and S2, the carrier CR1 supporting the pinion P1 and the pinion (common long pinion) P2, and the ring gear R1. Between the two pinions P1 and P2, the pinion P1 engages with the sun gear S1 and the ring gear R1, and the pinion P2, i.e., the common long pinion, engages with the sun gear S2 and the pinion P1. The ring gear R1 of the planetary gear unit 27 is coupled with the first brake B1 and the sun gear S2 is coupled with the second brake B2. As a whole, the sun gear S1, which is an input member, is coupled with the rotor 29 of the second electric motor 23 described next, and the carrier CR1, which is an output member, is coupled with the output shaft 12 similarly to the sun gear S0 of the power splitting planetary gear 21 described above. This transmission 22 is arranged so as to be able to change two deceleration stages where reduction ratios are different by engaging one of the first and second brakes B1 and B2 while releasing the other and by releasing the one while engaging the other. That is, the transmission 22 is arranged so as to change the degree of the motive power inputted from the second electric motor 23 described above via the sun gear S1 and to transmit it to the output shaft 12 via the carrier CR1.

The second electric motor 23 is disposed at the rearmost position with respect to the power splitting planetary gear 21, the first electric motor 20, and the transmission 22, i.e., at the position furthest from the internal combustion engine 5. The second electric motor 23 has the stator 28 fixed to the casing member 14 (see FIG. 1) and the rotor 29 rotatably supported on the inner diametric side of the stator 28. The rotor 29 of the second electric motor 23 is coupled with a sun gear S1 of the transmission 22 described above. Similarly to the first electric motor 20 described above, the second electric motor 23 is connected to the HV battery via the inverter. However, their main functions differ from each other. That is, differing from the first electric motor 20 which functions mainly for the purpose of power generation, the second electric motor 23 functions mainly as a driving motor for assisting the motive power (driving force) of the vehicle 1. However, the second electric motor 23 also functions as a generator in braking the vehicle for example by regenerating vehicular inertia force as electrical energy.

Among the power splitting planetary gear 21, the first electric motor 20, the transmission 22 and the second electric motor 23 described above, the first and second electric motors 20 and 23 are heavy devices which are heavier than the power splitting planetary gear 21 and the transmission 22. Then, in the present embodiment, the second electric motor 23, i.e., one of the heavy devices, is disposed at the rearmost position with respect to the power splitting planetary gear 21, the first electric motor 20, and the transmission 22, i.e., at the position furthest from the internal combustion engine 5 as shown in FIG. 7.

It is noted that the operation and effect of the hybrid driving unit 7B explained with reference to the skeleton view thereof in FIG. 7 will be explained after detailing the concrete structure of the hybrid driving unit 7B with reference to FIG. 8.

FIG. 8 shows an upper half portion of the longitudinal section view of the hybrid driving unit 7B including the axis 13.

The hybrid driving unit 7B shown in FIG. 8 comprises the input shaft 10 and the output shaft 12 disposed on the axis 13 and the power splitting planetary gear 21, the first electric motor 20, the transmission 22 and the second electric motor 23 disposed around the axis 13. All of these devices are stored within the casing member 14 together with the input shaft 10 and the output shaft 12, except a part of the rear end of the output shaft 12 (part of the rear end coupling section 12a) projects out of the casing member 14 to the rear.

Taking the readiness of assembly into account, the casing member 14 is divided into a plurality of parts in the longitudinal direction along the axis 13 and is formed in a body by combining junctions of the respective parts. For instance, one of the junctions H is located near the front part of the second electric motor 23. Note that other junctions are not shown in the figure. In the casing member 14, a plurality of partitions, i.e., partitions A, B, C, D and E as supporting members, are formed at different positions in the longitudinal direction in order from the front side. Among these partitions A through E, the partitions A and E are disposed near the front and rear ends of the casing member 14, respectively, and the space within the case between the partitions A and E is divided into four spaces by the partitions B, C and D longitudinally along the axis 13. These partitions A through E act as members for reinforcing the casing member 14 and are used for retaining bearings a through z described later and for forming the hydraulic chambers 40 and 45 described later.

The power splitting planetary gear 21, the first electric motor 20, the transmission 22 and the second electric motor 23 are stored within the four spaces divided by the partitions A through E, respectively. That is, the power splitting planetary gear 21 is stored in the space between the partitions A and B, the first electric motor 20 is stored between the partitions B and C, the transmission 22 is stored between the partitions C and D, and the second electric motor 23 is stored between the D and E, respectively. Beginning from the power splitting planetary gear 21, these devices will be explained in detail below.

The power splitting planetary gear 21 is disposed between the partitions A and B of the casing member 14. The power splitting planetary gear 21 comprises the single pinion planetary gear train disposed coaxially with the input shaft 10 as described above and has the ring gear (second rotary element) R0, the sun gear (third rotary element) S0 and the carrier (first rotary element) CR0 supporting the pinions P0. Among them, the ring gear R0 extends to the rear and is coupled with the rotor 25 of the first electric motor 20 through an intermediary of a coupling member 71. The coupling member 71 has a flange portion coupled with the rear end of the ring gear R0 and extending to the inner diametric side behind the carrier CR0 and a sleeve portion extending to the rear from the inner diametric end and coupled with the front end of the rotor 25. The front carrier plate CR0b of the carrier CR0 is coupled with the outer peripheral face of the input shaft 10. The sun gear S0 is coupled with a sleeve section 75 extending to the front from the front end coupling section 12c of the output shaft 12.

The bearings are fitted to the following positions for the power splitting planetary gear 21. The bearing a is fitted between the inner diametric rear face of the partition A and the front carrier plate CR0b and the bearing b is fitted between the inner diametric rear face of the front carrier plate CR0b and the front end face of the sun gear S0. The bearings d and e are fitted between the outer peripheral face of the input shaft 10 and the inner peripheral face of the sun gear S0 and the sleeve section 75. The bearings c and f are fitted between the inner diametric front face of the flange portion of the coupling member 71 and the rear carrier plate CR0a and between the inner peripheral face of the sleeve portion of the coupling member 71 and the outer peripheral face of the sleeve section 75. These bearings rotatably support the carrier CR0 in a body with the input shaft 10, the ring gear R0 in a body with the rotor 25 of the first electric motor 20 and the sun gear S0 in a body with the output shaft 12. Thus, in the power splitting planetary gear 21, the carrier CR0, which is the input section, is fixed to the input shaft 10 and the sun gear S0 and the ring gear R0, which are the output sections (to which power is split), are coupled with the front end of the rotor 25 of the first electric motor 20 and to the front end of the front end coupling section 12c of the output shaft 12, respectively. The power splitting planetary gear 21 is arranged so as to split the power of the internal combustion engine 5 inputted to the carrier CR0 via the input shaft 10 (see FIG. 1) to the side of the first electric motor 20 via the ring gear R0 and to the side of the output shaft 12 via the sun gear S0. The ratio of split of power at this time is decided based on the state of revolution of the first electric motor 20. That is, when the rotor of the first electric motor 20 is caused to generate a large power, an amount of power generated by the first electric motor 20 increases and the power outputted to the output shaft 12 is reduced to that extent. When the rotor 25 of the first electric motor 20 is caused to generate a small power in contrary, an amount of power generated by the first electric motor 20 decreases and the power outputted to the output shaft 12 increases to that extent.

The first electric motor 20 comprises an AC permanent magnet synchronous motor (brushless DC motor) for example. It is stored in the space between the partitions B and C and is disposed on the outer diametric side of the output shaft 12 coaxially therewith. The first electric motor 20 has the stator 24 fixed to the inner peripheral face of the casing member 14 and the rotor 25 rotatably disposed on the inner diametric side of the stator 24 apart from the stator 24 by the predetermined air gap G1. The rotor 25 is formed into a cylindrical shape and stages 30 and 31 are formed at the front and rear outer peripheral faces of the cylindrical part. The casing member 14 rotatably supports the rotor 25 through an intermediary of bearings h and i fitted while being positioned in the longitudinal direction between these stages 30 and 31 and the partitions B and C. The ring gear R0 of the power splitting planetary gear 21 described above is fixed to the front end of the cylindrical part through the coupling member 71. The front end coupling section 12c of the output shaft 12 relatively and rotatably supports the cylindrical part and the coupling member 71 through an intermediary of bearings f, g and k fixed on the outer peripheral face of the front end coupling section 12c. It is noted that as for the longitudinal disposition, the bearings g and f are disposed at the position corresponding to the bearing h and the bearing k is disposed at the position corresponding to the bearing i. Because the rotor 25 of the first electric motor 20 is rotatably supported by the casing member 14 through the intermediary of the bearings h and i fixed to the partitions B and C, the longitudinal and radial directions of the rotor 25 may be assured accurately. Accordingly, even if a force bending the casing member 14 in the vertical or horizontal direction acts on the casing member 14, the predetermined air gap G1 between the stator 24 and the rotor 25 may be kept accurately. It is noted that the first electric motor 20 is connected to the HV battery via the inverter as described above. The main function of the first electric motor 20 constructed as described above is to generate electric power based on the power split to the sun gear S0 of the power splitting planetary gear 21 explained above and to drive the second electric motor 23 via the inverter or to charge the HV battery.

The transmission 22 is disposed between the partitions C and D of the casing member 14, i.e., approximately at the intermediate position of the casing member 14 in the longitudinal direction (the direction along the axis 13). The transmission 22 has the Ravigneaux type planetary gear unit 27 disposed on the inner diametric side and the first and second brakes B1 and B2 disposed, respectively, on the front and rear sides on the outer diametric side thereof.

The planetary gear unit 27 has the first sun gear S1 (hereinafter simply referred to as 'the sun gear S1') disposed near the outer peripheral face at the front end side of the intermediate coupling section 12b of the output shaft 12, the second sun gear S2 (hereinafter simply referred to as 'the sun gear S2') disposed on the rear side of the sun gear S1 and slightly on the outer diametric side as compared to the sun gear S1, the ring gear R1 disposed on the outer diametric side of the sun gear S1, the pinion P1 engaging with the sun gear S1 and the ring gear R1, the pinion P2 composing the common long pinion and engaging with the sun gear S2 and the pinion P1, and the carrier CR1 supporting these pinions P1 and P2. Beginning from the sun gear S1, these parts will be explained below.

The sun gear S1 is coupled with the front end of the rotor 29 of the second electric motor 23 described later via the sleeve 33 fitted around the outer peripheral face of the front half of the intermediate coupling section 12b. This sun gear S1 is relatively and rotatably supported by the output shaft 12, together with the sleeve 33, through an intermediary of the bearings l and m fitted to the outer peripheral face of the output shaft 12.

The sun gear S2 is formed in a body with a flange portion 34 extending from the rear end of the sun gear S2 to the outer diametric side along the rear carrier plate CR1a of the carrier CR1 and with a drum portion 35 extending to the front from the outer diametric end of the flange portion 34. The second brake B2 described later is interposed between the outer peripheral face of this drum portion 35 and an inner peripheral spline 14a of the inner peripheral face of the casing member 14. The sun gear S2 is rotatably supported by bearings n and o fitted to the outer peripheral face of the sleeve 33 formed in a body with the sun gear S1 described above and bearings p and q fitted, respectively, to the front and rear faces on the inner diametric side (basal end side) of the flange portion 34. It is noted that the bearing p is interposed between the flange portion 34 and the inner diametric rear face of the rear carrier plate CR1a of the carrier CR1 and the bearing q is interposed between the flange portion 34 and the front face of the inner diametric side of the partition D.

The ring gear R1 is provided with a flange portion 36 fixed at the forefront thereof and extending to the inner diametric side along the front carrier plate CR1b of the carrier CR1 and is rotatably supported by bearings r and s fitted to the front and rear faces on the inner diametric side of the flange portion 36. The bearing r is interposed between the flange portion 36 and the inner diametric rear face of the partition C and the bearing s is interposed between the flange portion 36 and the front carrier plate CR1a of the carrier CR1. The first brake B1 is interposed between the outer peripheral face of the ring gear R1 and the inner peripheral spline 14a of the inner peripheral face of the casing member 14.

The pinion P1 is rotatably supported by the carrier CR1 and is engaged with the sun gear S1 described above on the inner diametric side and with the ring gear R1 described above on the outer diametric side.

The pinion P2 is the common long pinion in which the large-diametric gear P2a formed on the rear side and the small-diametric gear P2b formed on the front side are combined in a body. In the pinion P2, the large-diametric gear P2a is engaged with the sun gear S2 described above and the small-diametric gear P2b is engaged with the pinion P1 described above.

The carrier CR1 rotatably supports the pinions P1 and P2 by the front and rear carrier plates CR1b and CR1a. The front carrier plate CR1b is coupled with the outer peripheral face on the rear end of the front end coupling section 12c of the output shaft 12. The carrier CR1 is relatively and rotatably supported by the bearing s and t fitted to the inner diametric front and rear faces of the front carrier plate CR1b, the bearing u fitted between the carrier plate and the front end outer peripheral face of the intermediate coupling section 12b of the output shaft 12 and the bearing p fitted to the inner diametric front face of the rear carrier plate CR1a. It is noted that the bearing t is interposed between the carrier plate CR1b and the front end face of the sun gear S1 described above.

The first brake B1 has a number of discs and friction plates (brake plates) and is spline-coupled between an outer peripheral spline formed on the outer peripheral face of the ring gear R1 described above and the inner spline 14a formed on the inner peripheral face of the casing member 14. The hydraulic actuator 37 for the first brake is disposed on the front side of the first brake B1. The hydraulic actuator 37 has the piston 38 disposed on the front side of the first brake B1 so as to be movable in the longitudinal direction, the first hydraulic chamber 40 which is provided at the outer diametric rear face of the partition C and into which the front end of the piston 38 is oil-tightly fitted, and the return spring (compression spring) 42 interposed between the retainer 41 fixed to the inner peripheral face of the casing member 14 and the outer diametric rear face of the piston 38 to bias the piston 38 to the front.

The second brake B2 is disposed just behind the first brake B1 described above. The second brake B2 has a number of discs and friction plates (brake plates) and is spline-coupled between an outer peripheral spline formed on the outer peripheral face of the drum portion 35 combined with the sun gear S2 described above and the inner spline 14a formed on the inner peripheral face of the casing member 14. The hydraulic actuator 43 for the second brake is disposed on the rear side of the second brake B2. The hydraulic actuator 43 has the piston 44 disposed behind the second brake B2 so as to be movable in the longitudinal direction, the second hydraulic chamber 45 which is provided at the outer diametric rear face of the partition D and into which the rear end of the piston 44 is oil-tightly fitted, and the return spring (compression spring) 47 interposed between the retainer 46 fixed to the partition D and the inner diametric front face of the piston 44 to bias the piston 44 to the rear.

In the transmission 22 constructed as described above, an output from the second electric motor 23 is transmitted to the sun gear S1 via the sleeve 33. In a low state, the first brake B1 is engaged and the second brake B2 is released. Accordingly, the ring gear R1 is locked and the sun gear S2 is freely rotatable in this state. The revolution of the sun gear S1 described above is extensively reduced via the pinion P1 and is transmitted to the carrier CR1. The revolution of the carrier CR1 is then transmitted to the output shaft 12.

When the transmission 22 is in a high state, the first brake B1 is released and the second brake B2 is engaged. Accordingly, the sun gear S2 is locked and the ring gear R1 is freely rotatable in this state. In this state, the revolution of the sun gear S1 is transmitted to the pinion P1 and the pinion P2 engages with the locked sun gear S2. Then, the carrier CR1 moves around the sun gear at a restricted predetermined number of revolution and the revolution of the carrier CR1 reduced in a relatively small extent is transmitted to the output shaft 12 at this time.

Thus, the transmission 22 transmits the extensively reduced revolution to the output shaft 12 in the low state by engaging the first brake B1 and by releasing the second brake B2, respectively. In contrast, the transmission 22 transmits the revolution reduced by a relatively small extent to the output shaft 12 by releasing the first brake B1 and by engaging the second brake B2, respectively. Because the transmission 22 is thus capable of shifting in the two stages, the second electric motor 23 maybe downsized. That is, the transmission 22 enables to use a small electric motor, to transmit sufficient driving torque to the output shaft 12 in the low state in starting the vehicle 1 when high torque is required, and to prevent the rotor 29 from rotating at high-speed by putting it in the high state when the output shaft 12 is rotating at high-speed.

The second electric motor 23 comprises a permanent magnet synchronous motor (brushless DC motor) for example and is disposed on the outer diametric side of the output shaft 12 coaxially therewith. The second electric motor 23 has the stator 28 fixed to the inner peripheral face of the casing member 14 and the rotor 29 rotatably disposed on the inner diametric side of the stator 28 apart from the stator 28 by a predetermined air gap G2. The inner diametric side of the rotor 29 is formed in a cylindrical shape and stages 48 and 50 are formed, respectively, at the front and rear outer peripheral faces of the cylindrical part. The casing member 14 rotatably supports the rotor 29 through an intermediary of bearings v and w fitted between the stages 48 and 50 and the partitions D and E while being positioned in the longitudinal direction. The sleeve 33 formed in a body with the sun gear S1 of the transmission 22 described above is fixed at the front end of the cylindrical part. The output shaft 12 relatively and rotatably supports the rotor 29 and the sun gear S1 mutually formed in a body through an intermediary of bearings 1, m and x fixed on the outer peripheral face of the output shaft 12. It is noted that the bearings m and x are disposed at the positions corresponding to the bearings v and w in terms of disposition in the longitudinal direction. Since the rotor 29 of the second electric motor 23 is rotatably supported so as to be sandwiched by the casing member 14 and the output shaft 12 through the intermediary of the bearings v and w fixed to the partitions D and E and the bearings m and x fixed to the outer peripheral face of the output shaft 12 as described above, the longitudinal and radial positions of the rotor 29 maybe maintained accurately. Accordingly, even if a force that may bend the casing member 14 in the vertical or lateral direction acts thereon, the predetermined air gap G2 between the stator 28 and the rotor 29 may be kept accurately. It is noted that the second electric motor 23 is connected to the HV battery via the inverter similarly to the first electric motor 20 as described above.

The casing member 14 storing the power splitting planetary gear 21, the first electric motor 20, the transmission 22 and the second electric motor 23 as described above has the boss section 14*b* which extends to the rear on the inner diametric side of the partition E at the rear end thereof. The casing member 14 rotatably supports the rear end coupling section 12*a* of the output shaft 12 by the boss section 14*b* through an intermediary of bearings y and z.

The outer diametric side of the partition E of the casing member 14 is thickened to compose the mounting section 14*c*. The coupling section 14*d* at the front end of the casing member 14 is connected with the internal combustion engine 5 rubber-mounted to the body 4 (see FIG. 1) and the rear end thereof is rubber-mounted to the part 4*a* of the body by utilizing the mounting section 14*c*. That is, the part 4*a* of the body is provided with the rubber pedestal 51 to which the stay 55 is fixed by the bolt 52, the washer 53 and the nut 54. Then, the casing member 14 is mounted to the stay 55 described above by the bolt 56 screwed to the mounting section 14*c* near the rear end of the casing member 14. It is noted that because the casing member 14 is arranged so that the gap G3 between the bolt 52 on the part 4*a* side and the bolt 56 on the casing member 14 side is shorter than a screwing length of the bolt 56, the bolt 56 will not come out of the mounting section 14*c* and thus the rear end of the casing member 14 will not be put out of the body part 4*a* even if the bolt 56 is happened to be loosened.

Since the partitions D and E extending from the casing member 14 as the supporting members support the both sides of the rotor 29 of the second electric motor 23 through the intermediary of the bearings r and s as described above and the accuracy for supporting the rotor 29 is improved, the gap between the stator 28 and the rotor 29 may be reduced. Thereby, the output of the second electric motor 23 may be improved. Still more, since the mounting section 14*c* is provided at the position axially overlapping with the rear partition E among the two partitions D and E and the rigidity for supporting the rotor 29 may be improved, it becomes possible to suppress the vibration occurring in the casing member 14 and to reduce the vibration propagating from the casing member 14 to the body 4.

Next, a first modification of the hybrid driving unit 7B of the present embodiment will be explained with reference to a skeleton view in FIG. 9.

Figure 9:
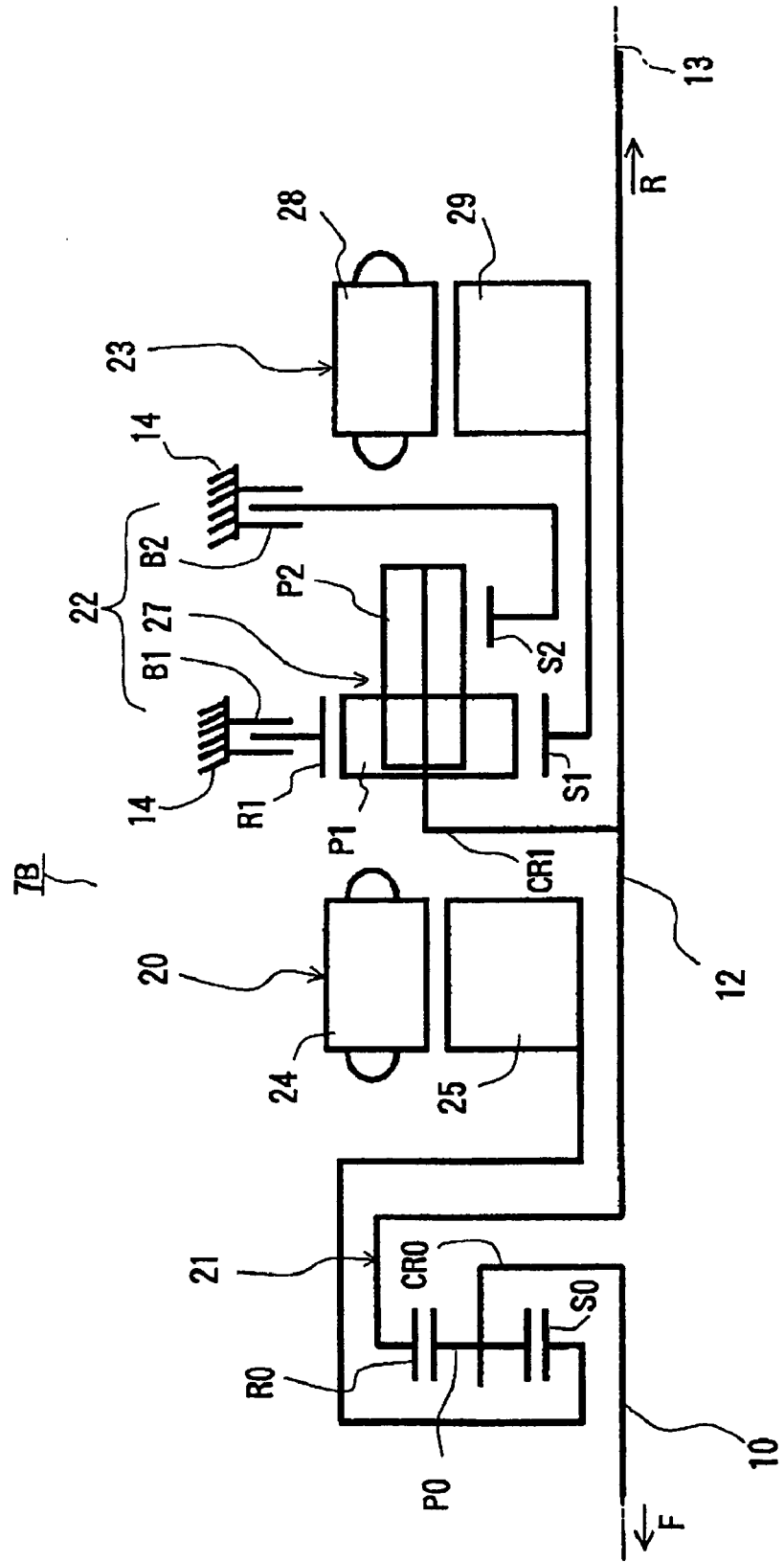
FIG. 9 is a skeleton view showing a first modification of the hybrid driving unit of the second embodiment.

As shown in FIG. 9, the hybrid driving unit 7B comprises the power splitting planetary gear 21, the first electric motor 20, the transmission 22 and the second electric motor 23 in order from the side closer to the internal combustion engine 5 in FIG. 1, i.e., in order from the front side to the rear side. All of these are stored within the casing member 14 (see FIG. 1) and are disposed in line around the axis 13. These devices will be explained below in the order of the power splitting planetary gear 21, the first electric motor 20, the transmission 22 and the second electric motor 23.

The power splitting planetary gear 21 comprises a single pinion planetary gear train disposed coaxially with the input shaft 10. The power splitting planetary gear 21 has the carrier (first rotary element) CR0 supporting a plurality of pinions P0, the sun gear (second rotary element) S0 and the ring gear (third rotary element) R0 each engaging with the pinions P0. The carrier CR0 of the power splitting planetary gear 21 is coupled with the input shaft 10, the sun gear S0 is coupled with the rotor 25 of the first electric motor 20 and the ring gear R0 is coupled with the output shaft 12. The power splitting planetary gear 21 splits the motive power inputted to the carrier CR0 via the input shaft 10 to the first electric motor 20 via the sun gear G0 and to the output shaft 12 via the ring gear R0 based on the control on the revolution of the first electric motor 20. It is noted that the power split to the first electric motor 20 is used for generating electricity and the power split to the output shaft 12 is used for driving the vehicle 1.

The first electric motor 20 has the stator 24 fixed to the casing member 14 (see FIG. 1) and the rotor 25 rotatably supported on the inner diametric side of the stator 24. The rotor 25 of the first electric motor 20 is coupled with a sun gear S0 of the power splitting planetary gear 21 described above. The first electric motor 20 generates electricity based on the motive power inputted via the sun gear S0 and drives the second electric motor 23 or charges the HV battery (hybrid driving battery) not shown via the inverter not shown.

The transmission 22 has the so-called Ravigneaux type planetary gear unit 27 comprising one double pinion planetary gear train and the single planetary gear train that uses one of their pinions in common. The transmission 22 also has the first and second brakes B1 and B2.

The planetary gear unit 27 comprises two sun gears S1 and S2, the carrier CR1 supporting the pinion P1 and the pinion (common long pinion) P2, and the ring gear R1. Between the two pinions P1 and P2, the pinion P1 engages with the sun gear S1 and the ring gear R1, and the pinion P2, i.e., the common long pinion, engages with the sun gear S2 and the pinion P1. The ring gear R1 of the planetary gear unit 27 is coupled with the first brake B1 and the sun gear S2 is coupled with the second brake B2. As a whole, the sun gear S1, which is the input member, is coupled with the rotor 29 of the second electric motor 23 described next, and the carrier CR1, which is the output member, is coupled with the output shaft 12 similarly to the ring gear R0 of the power splitting planetary gear 21 described above. This transmission 22 is arranged so as to be able to change two deceleration stages where reduction ratios are different by engaging one of the first and second brakes B1 and B2 while releasing the other and by releasing the one while engaging the other as described later. That is, the transmission 22 is arranged so as to change the degree of the motive power inputted from the second electric motor 23 described above via the sun gear S1 and to transmit it to the output shaft 12 via the carrier CR1.

The second electric motor 23 is disposed at the rearmost position among the power splitting planetary gear 21, the first electric motor 20, the transmission 22 and the second electric motor 23 described above, i.e., at the position furthest from the internal combustion engine 5. The second electric motor 23 has the stator 28 fixed to the casing member 14 (see FIG. 1) and the rotor 29 rotatably supported on the inner diametric side of the stator 28. The rotor 29 of the second electric motor 23 is coupled with the sun gear S1 of the transmission 22 described above. Similarly to the first electric motor 20 described above, the second electric motor 23 is connected to the HV battery via the inverter. The second electric motor 23 is arranged to assist the drive of the output shaft 12 via the transmission 22 and to regenerate energy.

Next, a second modification of the hybrid driving unit 7B of the present embodiment will be explained with reference to a skeleton view in FIG. 10.

Figure 10:
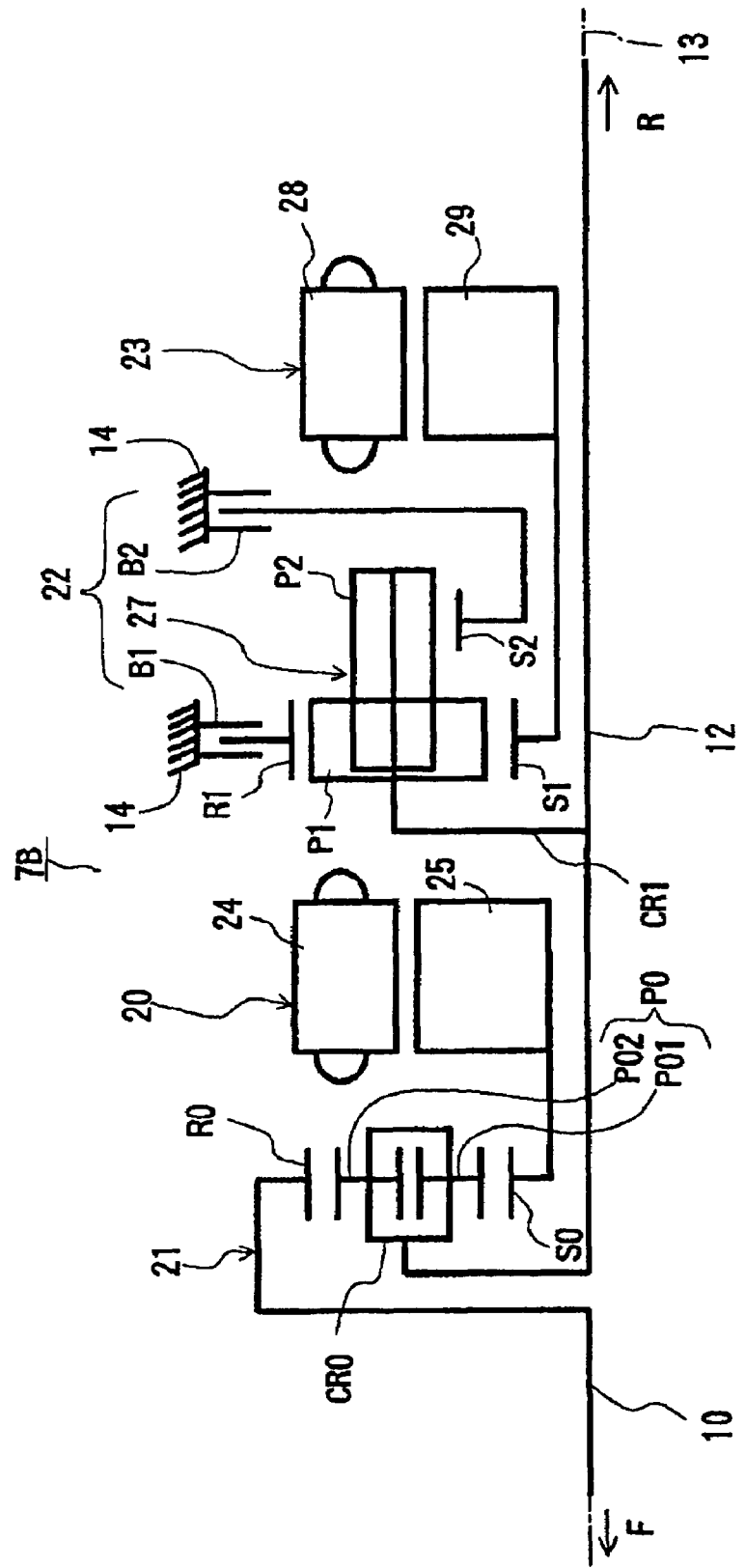
FIG. 10 is a skeleton view showing a second modification of the hybrid driving unit of the second embodiment.

As shown in FIG. 10, the hybrid driving unit 7B comprises the power splitting planetary gear 21, the first electric motor 20, the transmission 22 and the second electric motor 23 in order from the side closer to the internal combustion engine 5 in FIG. 1, i.e., in order from the front side to the rear side. All of these are stored within the casing member 14 (see FIG. 1) and are disposed in line around the axis 13. These devices will be explained below in the order of the power splitting planetary gear 21, the first electric motor 20, the transmission 22 and the second electric motor 23.

The power splitting planetary gear 21 comprises a double pinion planetary gear train disposed coaxially with the output shaft 12. The power splitting planetary gear 21 has the carrier (third rotary element) CR0 supporting the plurality of pinions P0 (P0 and P02), the sun gear (second rotary element) S0 and the ring gear (third rotary element) R0 each engaging with the pinions P01 and P02. The ring gear R0 of the power splitting planetary gear 21 is coupled with the input shaft 10, the sun gear S0 is coupled with the rotor 25 of the first electric motor 20 and the carrier CR0 is coupled with the output shaft 12. The power splitting planetary gear 21 constructed as described above splits the motive power inputted to the ring gear R0 via the input shaft 10 to the first electric motor 20 via the sun gear S0 and to the output shaft 12 via the carrier CR0 based on the control on the revolution of the first electric motor 20. It is noted that the power split to the first electric motor 20 is used for generating electricity and the power split to the output shaft 12 is used for driving the vehicle 1.

The first electric motor 20 has the stator 24 fixed to the casing member 14 (see FIG. 1) and the rotor 25 rotatably supported on the inner diametric side of the stator 24. The rotor 25 of the first electric motor 20 is coupled with a sun gear S0 of the power splitting planetary gear 21 described above. The first electric motor 20 mainly generates electricity based on the motive power inputted via the sun gear S0 and drives the second electric motor 23 or charges the HV battery (hybrid driving battery) not shown via the inverter not shown.

The transmission 22 has the so-called Ravigneaux type planetary gear unit 27 comprising one double pinion planetary gear train and a single planetary gear train that uses one of their pinions in common. The transmission 22 also has the first and second brakes B1 and B2.

The planetary gear unit 27 comprises two sun gears S1 and S2, the carrier CR1 supporting the pinion P1 and the pinion (common long pinion) P2, and the ring gear R1. Between the two pinions P1 and P2, the pinion P1 engages with the sun gear S1 and the ring gear R1, and the pinion P2, i.e., the common long pinion, engages with the sun gear S2 and the pinion P1. The ring gear R1 of the planetary gear unit 27 is coupled with the first brake B1 and the sun gear S2 is coupled with the second brake B2. As a whole, the sun gear S1, which is the input member, is coupled with the rotor 29 of the second electric motor 23 described next, and the carrier CR1, which is the output member, is coupled with the output shaft 12 similarly to the carrier CR0 of the power splitting planetary gear 21 described above. This transmission 22 is arranged so as to be able to change two deceleration stages where reduction ratios are different by engaging one of the first and second brakes B1 and B2 while releasing the other and by releasing the one while engaging the other. That is, the transmission 22 is arranged so as to change the degree of the motive power inputted from the second electric motor 23 described next via the sun gear S1 and to transmit it to the output shaft 12 via the carrier CR1.

The second electric motor 23 is disposed at the rearmost position among the power splitting planetary gear 21, the first electric motor 20, the transmission 22 and the second electric motor 23 described above, i.e., at the position furthest from the internal combustion engine 5. The second electric motor 23 has the stator 28 fixed to the casing member 14 (see FIG. 1) and the rotor 29 rotatably supported on the inner diametric side of the stator 28. The rotor 29 of the second electric motor 23 is coupled with the sun gear S1 of the transmission 22 described above. Similarly to the first electric motor 20 described above, the second electric motor 23 is connected to the HV battery via the inverter. The second electric motor 23 is arranged to assist the drive of the output shaft 12 via the transmission 22 and to regenerate energy.

Next, a third modification of the hybrid driving unit 7B of the present embodiment will be explained with reference to a skeleton view in FIG. 11.

Figure 11:
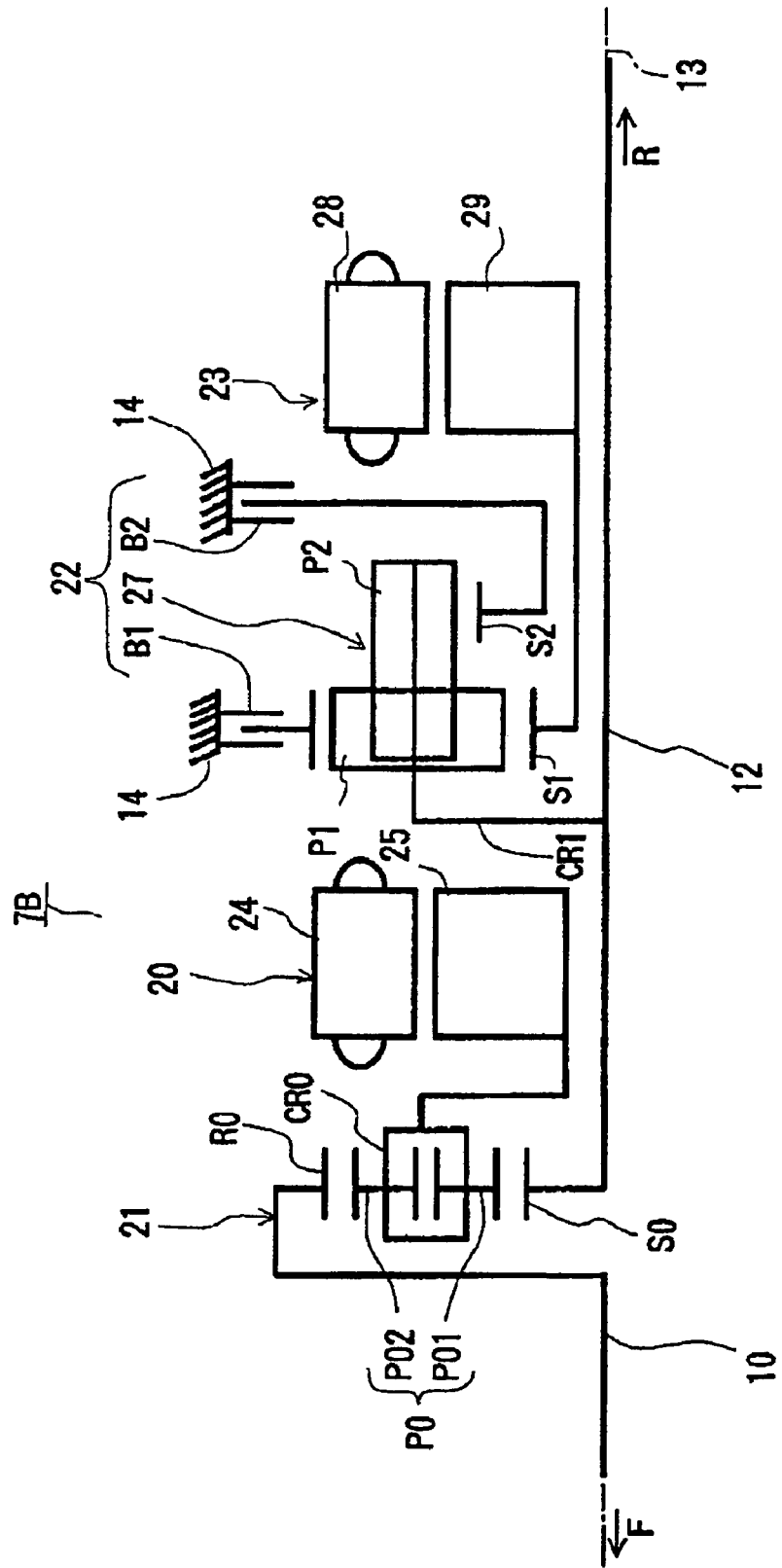
FIG. 11 is a skeleton view showing a third modification of the hybrid driving unit of the second embodiment.

As shown in FIG. 11, the hybrid driving unit 7B comprises the power splitting planetary gear 21, the first electric motor 20, the transmission 22 and the second electric motor 23 in order from the side closer to the internal combustion engine 5 in FIG. 1, i.e., in order from the front side to the rear side. All of these are stored within the casing member 14 (see FIG. 1) and are disposed in line around the axis 13. These devices will be explained below in the order of the power splitting planetary gear 21, the first electric motor 20, the transmission 22 and the second electric motor 23.

The power splitting planetary gear 21 comprises a double pinion planetary gear train disposed coaxially with the output shaft 12. The power splitting planetary gear 21 has the carrier (second rotary element) CR0 supporting the plurality of pinions P0 (P01 and P02), the sun gear (third rotary element) S0 and the ring gear (first rotary element) R0 each engaging with the pinions P01 and P02. The ring gear R0 of the power splitting planetary gear 21 is coupled with the input shaft 10, the carrier CR0 is coupled with the rotor 25 of the first electric motor 20 and the sun gear S0 is coupled with the output shaft 12. The power splitting planetary gear 21 constructed as described above splits the motive power inputted to the ring gear R0 via the input shaft 10 to the first electric motor 20 via the carrier CR0 and to the output shaft 12 via the sun gear S0 based on the control on the revolution of the first electric motor 20. It is noted that the power split to the first electric motor 20 is used for generating electricity and the power split to the output shaft 12 is used for driving the vehicle 1.

The first electric motor 20 has the stator 24 fixed to the casing member 14 (see FIG. 1) and the rotor 25 rotatably supported on the inner diametric side of the stator 24. The rotor 25 of the first electric motor 20 is coupled with the carrier CR0 of the power splitting planetary gear 21 described above. The first electric motor 20 mainly generates electricity based on the motive power inputted via the sun gear S0 and drives the second electric motor 23 or charges the HV battery (hybrid driving battery) not shown via the inverter not shown.

The transmission 22 has the so-called Ravigneaux type planetary gear unit 27 comprising one double pinion planetary gear train and a single planetary gear train that uses one of their pinions in common. The transmission 22 also has the first and second brakes B1 and B2.

The planetary gear unit 27 comprises two sun gears S1 and S2, the carrier CR1 supporting the pinion P1 and the pinion (common long pinion) P2, and the ring gear R1. Between the two pinions P1 and P2, the pinion P1 engages with the sun gear S1 and the ring gear R1, and the pinion P2, i.e., the common long pinion, engages with the sun gear S2 and the pinion P1. The ring gear R1 of the planetary gear unit 27 is coupled with the first brake B1 and the sun gear S2 is coupled with the second brake B2. As a whole, the sun gear S1, which is the input member, is coupled with the rotor 29 of the second electric motor 23 described next, and the carrier CR1, which is the output member, is coupled with the output shaft 12 similarly to the sun gear S0 of the power splitting planetary gear 21 described above. This transmission 22 is arranged so as to be able to change two deceleration stages where reduction ratios are different by engaging one of the first and second brakes B1 and B2 while releasing the other and by releasing the one while engaging the other as described later. That is, the transmission 22 is arranged so as to change the degree of the motive power inputted from the second electric motor 23 described above via the sun gear S1 and to transmit it to the output shaft 12 via the carrier CR1.

The second electric motor 23 is disposed at the rearmost position among the power splitting planetary gear 21, the first electric motor 20, the transmission 22 and the second electric motor 23 described above, i.e., at the position furthest from the internal combustion engine 5. The second electric motor 23 has the stator 28 fixed to the casing member 14 (see FIG. 1) and the rotor 29 rotatably supported on the inner diametric side of the stator 28. The rotor 29 of the second electric motor 23 is coupled with the sun gear S1 of the transmission 22 described above. Similarly to the first electric motor 20 described above, the second electric motor 23 is connected to the HV battery via the inverter. The second electric motor 23 is arranged to assist the drive of the output shaft 12 via the transmission 22 and to regenerate energy.

Third Embodiment

Next, a hybrid driving unit 7C of a third embodiment will be explained as another example of the inventive hybrid driving unit 7 mounted to the vehicle 1 shown in FIG. 1. The outline of the whole hybrid driving unit 7B will be explained at first with reference to the skeleton view in FIG. 12 and then its concrete structure will be detailed with reference to FIG. 13. It is noted that in these figures, the direction indicated by an arrow F denotes the front side of a body (the internal combustion engine side) and the direction indicated by an arrow R denotes the rear side thereof (the differential unit side).

Figure 12:
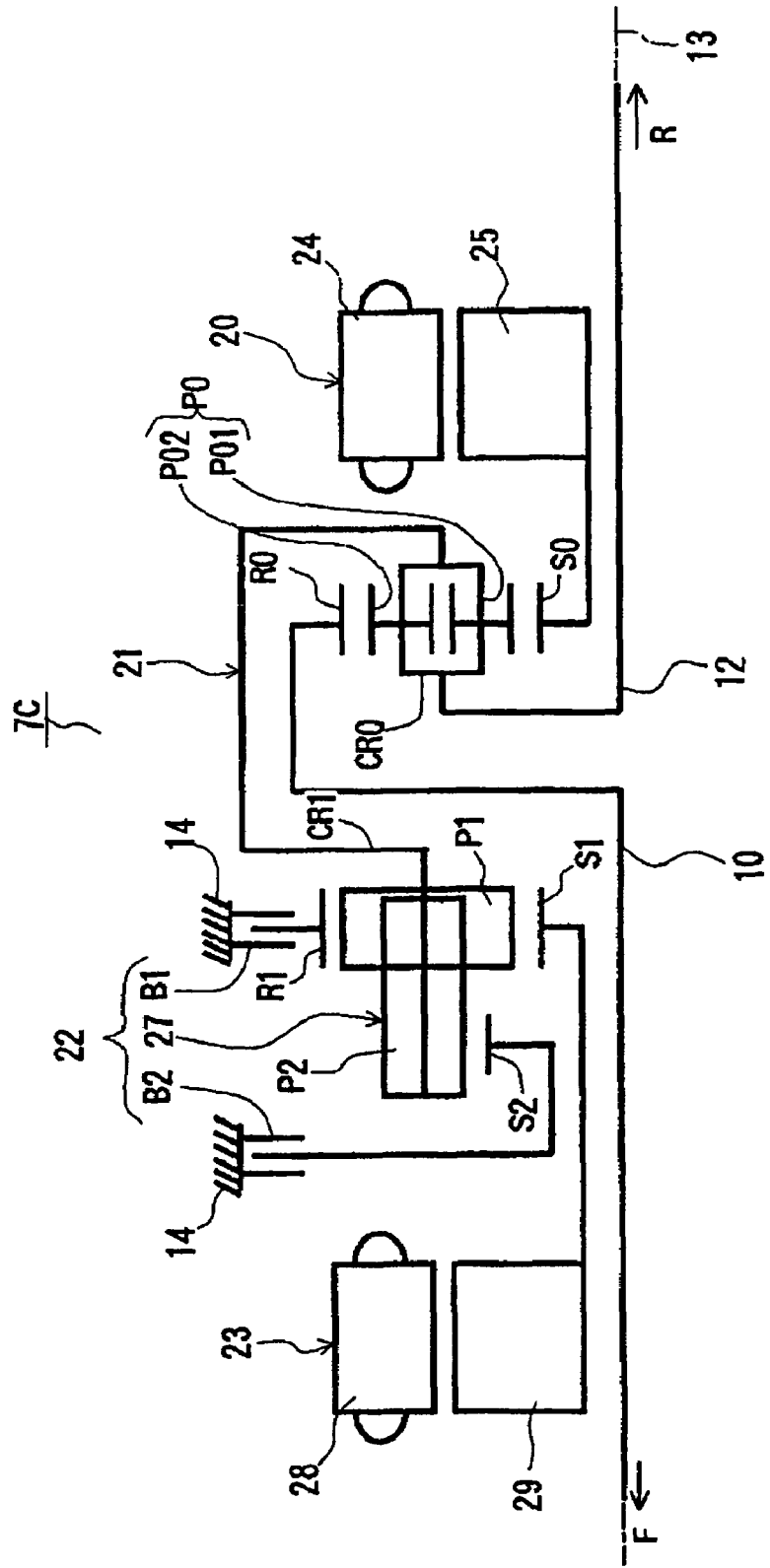
FIG. 12 is a skeleton view showing a hybrid driving unit of a third embodiment.

As shown in FIG. 12, the hybrid driving unit 7C comprises the second electric motor 23, the transmission 22, the power splitting planetary gear 21 and the second electric motor 23 in order from the side closer to the internal combustion engine 5 in FIG. 1, i.e., in order from the front side to the rear side. All of these are stored within the casing member 14 (see FIG. 1) and are disposed in line around the axis 13. These devices will be explained below in the order of the second electric motor 23, the transmission 22, the power splitting planetary gear 21 and the first electric motor 20.

The second electric motor 23 has the stator 28 fixed to the casing member 14 (see FIG. 1) and the rotor 29 rotatably supported on the inner diametric side of the stator 28. The rotor 29 of the second electric motor 23 is coupled with a sun gear S1 of the transmission 22 described later. Similarly to the first electric motor 20 described later, the second electric motor 23 is connected to the HV battery (hybrid driving battery) not shown via the inverter not shown. However, their main functions differ from each other. That is, differing from the first electric motor 20 which functions mainly for the purpose of power generation, the second electric motor 23 functions mainly as a driving motor for assisting the motive power (driving force) of the vehicle 1. However, the second electric motor 23 also functions as a generator in braking the vehicle for example by regenerating vehicular inertia force as electrical energy.

The transmission 22 has the so-called Ravigneaux type planetary gear unit 27 comprising one double pinion planetary gear train and the single planetary gear train that uses one of their pinions in common. The transmission 22 also has the first and second brakes B1 and B2.

The planetary gear unit 27 comprises two sun gears S1 and S2, the carrier CR1 supporting the pinion P1 and the pinion (common long pinion) P2, and the ring gear R1. Between the two pinions P1 and P2, the pinion P1 engages with the sun gear S1 and the ring gear R1, and the pinion P2, i.e., the common long pinion, engages with the sun gear S2 and the pinion P1. The ring gear R1 of the planetary gear unit 27 is coupled with the first brake B1 and the sun gear S2 is coupled with the second brake B2. As a whole, the sun gear S1, which is the input member, is coupled with the rotor 29 of the second electric motor 23 described next, and the carrier CR1, which is the output member, is coupled with the output shaft 12 similarly to the carrier CR0 of the power splitting planetary gear 21 described later. This transmission 22 is arranged so as to be able to change two deceleration stages where reduction ratios are different by engaging one of the first and second brakes B1 and B2 while releasing the other and by releasing the one while engaging the other. That is, the transmission 22 is arranged so as to change the degree of the motive power inputted from the second electric motor 23 described above via the sun gear S1 and to transmit it to the output shaft 12 via the carrier CR1.

The power splitting planetary gear 21 comprises a double pinion planetary gear train disposed coaxially with the output shaft 12. The power splitting planetary gear 21 has the carrier (third rotary element) CR0 supporting a plurality of pinions P01 and P02, the sun gear (second rotary element) S0 engaging with the pinion P01 and the ring gear (first rotary element) R0 engaging with the pinion P02. The ring gear R0 of the power splitting planetary gear 21 is coupled with the input shaft 10, the sun gear S0 is coupled with the rotor 25 of the first electric motor 20 and the carrier CR0 is coupled with the output shaft 12. The power splitting planetary gear 21 constructed as described above splits the motive power inputted to the ring gear R0 via the input shaft 10 to the first electric motor 20 via the sun gear S0 and to the output shaft 12 via the carrier CR0 based on the control on the revolution of the first electric motor 20. It is noted that the power split to the first electric motor 20 is used for generating electricity and the power split to the output shaft 12 is used for driving the vehicle 1.

The first electric motor 20 is disposed at the rearmost side among the second electric motor 23, the transmission 22, the power splitting planetary gear 21 and the first electric motor 20, i.e., at the position furthest from the internal combustion engine 5. The first electric motor 20 has the stator 24 fixed to the casing member 14 (see FIG. 1) and the rotor 25 rotatably supported on the inner diametric side of the stator 24. The rotor 25 of the first electric motor 20 is coupled with the sun gear S0 of the power splitting planetary gear 21 described above. The first electric motor 20 constructed as described above mainly generates electricity based on the motive power inputted via the sun gear S0 and drives the second electric motor 23 or charges the HV battery via the inverter not shown.

Among the second electric motor 23, the transmission 22, the power splitting planetary gear 21 and the first electric motor 20 described above, the first and second electric motors 20 and 23 are heavy devices which are heavier than the power splitting planetary gear 21 and the transmission 22. Then, in the present embodiment, the first electric motor 20, i.e., one of the heavy devices, is disposed at the rearmost position among the second electric motor 23, the transmission 22, the power splitting planetary gear 21 and the first electric motor 20, i.e., at the position furthest from the internal combustion engine 5 as shown in FIG. 12.

It is noted that the operation and effect of the hybrid driving unit 7C explained with reference to the skeleton view thereof in FIG. 12 will be explained after detailing the concrete structure of the hybrid driving unit 7C with reference to FIG. 13.

Figure 13:
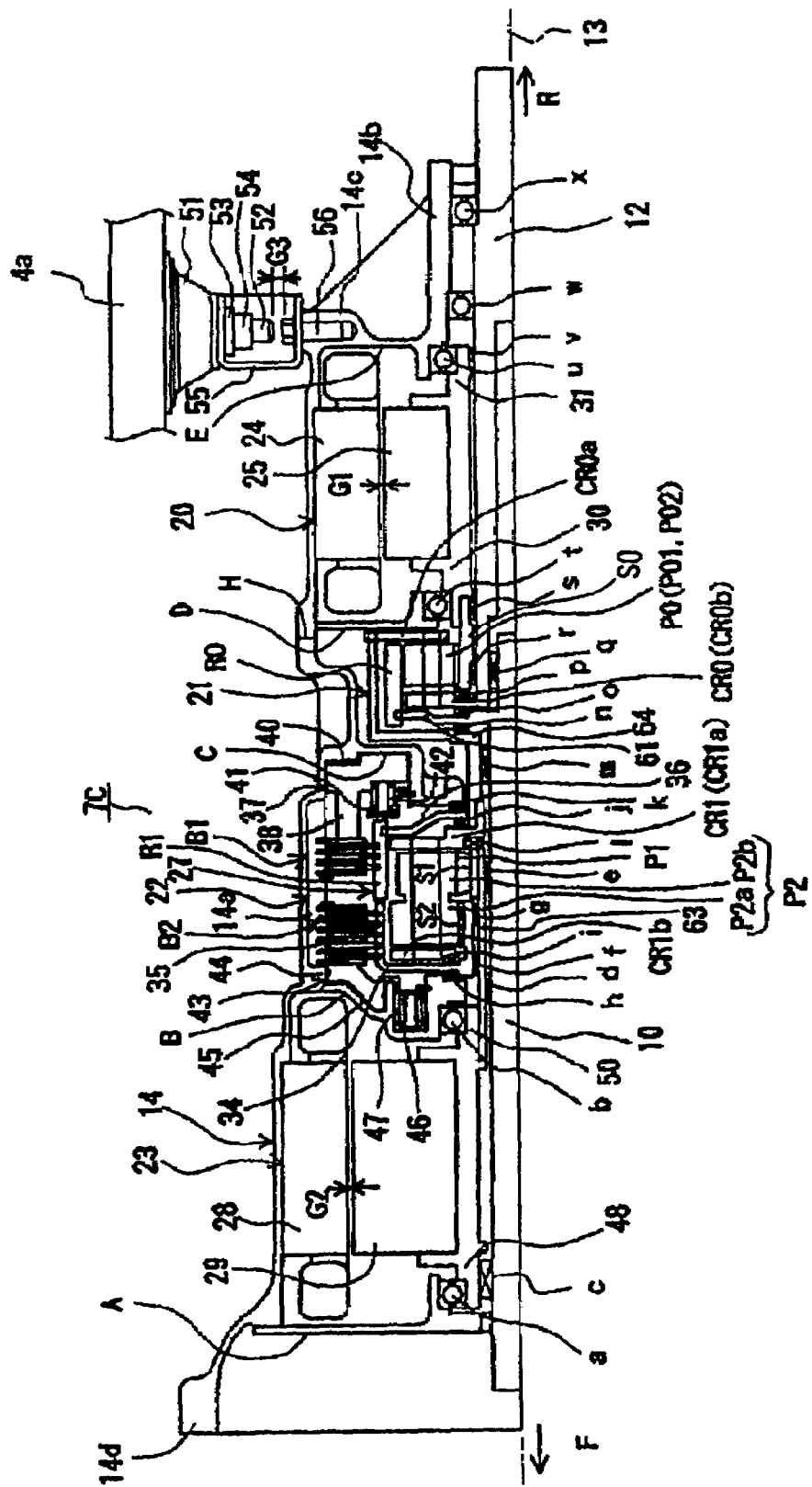
FIG. 13 is a longitudinal section view showing the structure of the hybrid driving unit of the third embodiment.

FIG. 13 shows an upper half portion of the longitudinal section view of the hybrid driving unit 7C including the axis 13.

The hybrid driving unit 7C shown in FIG. 13 comprises the input shaft 10 and the output shaft 12 disposed on the axis 13 and the second electric motor 23, the transmission 22, the power splitting planetary gear 21 and the first electric motor 20 disposed around the axis 13. All of these devices are stored within the casing member 14, except of apart of the rear end of the output shaft 12 projecting out of the casing member 14 to the rear.

Taking the readiness of assembly and others into account, the casing member 14 is divided into a plurality of parts in the longitudinal direction along the axis 13 and is formed in a body by combining junctions of the respective parts. For instance, one of the junctions H is located near the front part of the first electric motor 20. Note that other junctions are not shown in the figure. In the casing member 14, a plurality of partitions, i.e., partitions A, B, C, D and E, are formed at different positions in the longitudinal direction in order from the front side. Among these partitions A through E, the partitions A and E are disposed near the front and rear ends of the casing member 14, respectively, and the space within the case between the partitions A and E is divided into four spaces by the partitions B, C and D longitudinally along the axis 13. These partitions A through E act as members for reinforcing the casing member 14 and are used for retaining bearings a through x described later and for forming the hydraulic chambers 40 and 45 described later.

The second electric motor 23, the transmission 22, the power splitting planetary gear 21 and the first electric motor 20 are stored within the four spaces divided by the partitions A through E, respectively. That is, the second electric motor 23 is stored in the space between the partitions A and B, the transmission 22 is stored between the partitions B and C, the power splitting planetary gear 21 is stored between the partitions C and D, and the first electric motor 20 is stored between the D and E, respectively. Beginning from the second electric motor 23, these devices will be explained in detail below.

The second electric motor 23 comprises a permanent magnet synchronous motor (brushless DC motor) for example and is disposed on the outer diametric side of the input shaft 10 coaxially therewith. The second electric motor 23 has the stator 28 fixed to the inner peripheral face of the casing member 14 and the rotor 29 rotatably disposed on the inner diametric side of the stator 28 apart from the stator 28 by a predetermined air gap G2. The inner diametric side of the rotor 29 is formed in a cylindrical shape and stages 48 and 50 are formed, respectively, at the front and rear outer peripheral faces of the cylindrical part. The casing member 14 rotatably supports the rotor 29 through an intermediary of bearings a and b fitted between the stages 48 and 50 and the partitions A and B while being positioned in the longitudinal direction. The rear end of the cylindrical part is coupled with the sun gear S1 of the transmission 22 described later via the sleeve 63 fitted around the outer peripheral face of the input shaft 10. The input shaft 10 relatively and rotatably supports the rotor 29 and the sun gear S1 mutually formed in a body through an intermediary of bearings c, d and e fixed on the outer peripheral face of the input shaft 10. It is noted that the bearings c and d are disposed at the positions corresponding to the bearings a and b in terms of disposition in the longitudinal direction. Since the rotor 29 of the second electric motor 23 is rotatably supported by the bearings a and b fixed to the partitions A and B, the longitudinal and radial positions of the rotor 29 may be maintained accurately. Accordingly, even if a force that may bend the casing member 14 in the vertical or lateral direction acts thereon, the predetermined air gap G2 between the stator 28 and the rotor 29 may be kept accurately. It is noted that the second electric motor 23 is connected to the HV battery via the inverter similarly to the first electric motor 20 as described later.

The input shaft 10 is rotatably supported by the casing member 14 through the intermediary of the bearing c provided at the position coaxially overlapping with the bearing a, the bearing q provided between the outer peripheral face at the rear end of the input shaft 10 and the inner peripheral face of the cylindrical part at the front end of the output shaft 12, the bearings r and s provided between the output shaft 12 and the rotor 25 of the first electric motor 20, and the bearing t provided between the rotor 25 of the first electric motor 20 and the partition D.

The transmission 22 is disposed between the partitions B and C of the casing member 14, i.e., approximately at the intermediate position of the casing member 14 in the longitudinal direction (the direction along the axis 13). The transmission 22 has the Ravigneaux type planetary gear unit 27 disposed on the inner diametric side and the first and second brakes B1 and B2 disposed, respectively, on the front and rear sides on the outer diametric side thereof.

The planetary gear unit 27 has the first sun gear S1 (hereinafter simply referred to as 'the sun gear S1'), the second sun gear S2 (hereinafter simply referred to as 'the sun gear S2') disposed on the front side of the sun gear S1 and slightly on the outer diametric side as compared to the sun gear S1, the ring gear R1 disposed on the outer diametric side of the sun gear S1, the pinion P1 engaging with the sun gear S1 and the ring gear R1, the pinion P2 composing the common long pinion and engaging with the sun gear S2 and the pinion P1, and the carrier CR1 supporting these pinions P1 and P2. Beginning from the sun gear S1, these parts will be explained below.

The sun gear S1 is coupled with the rear end of the rotor 29 of the second electric motor 23 described later via the sleeve 63. This sun gear S1 is relatively and rotatably supported by the input shaft 10, together with the sleeve 63, through an intermediary of the bearings c, d and e fitted to the outer peripheral face of the input shaft 10.

The sun gear S2 is formed in a body with a flange portion 34 extending from the front end of the sun gear S2 to the outer diametric side along the front carrier plate CR1b of the carrier CR1 and with a drum portion 35 extending to the rear from the outer diametric end of the flange portion 34. The second brake B2 described later is interposed between the outer peripheral face of this drum portion 35 and the inner peripheral spline 14a of the inner peripheral face of the casing member 14. The sun gear S2 is rotatably supported by bearings f and g fitted to the outer peripheral face of the sleeve 63 formed in a body with the sun gear S1 described above and bearings h and i fitted, respectively, to the front and rear faces on the inner diametric side (basal end side) of the flange portion 34. It is noted that the bearing h is interposed between the flange portion 34 and the rear face of the inner diametric side of the partition B and the bearing i is interposed between the flange portion 34 and the inner diametric front face of the front carrier plate CR1b of the carrier CR1 described later.

The ring gear R1 is provided with a flange portion 36 fixed at the rear end thereof and extending to the inner diametric side along the rear carrier plate CR1a of the carrier CR1 and is rotatably supported by bearings j and k fitted to the front and rear faces on the inner diametric side of the flange portion 36. The bearing j is interposed between the flange portion 36 and the rear carrier plate CR1a of the carrier CR1 and the bearing k is interposed between the flange portion 36 and the inner diametric front face of the partition C. The first brake B1 is interposed between the outer peripheral face of the ring gear R1 and the inner peripheral spline 14a of the inner peripheral face of the casing member 14.

The pinion P1 is rotatably supported by the carrier CR1 and is engaged with the sun gear S1 described above on the inner diametric side and with the ring gear R1 described above on the outer diametric side.

The pinion P2 is the common long pinion in which the large-diametric gear P2a formed on the rear side and the small-diametric gear P2b formed on the front side are combined in a body. In the pinion P2, the large-diametric gear P2a is engaged with the sun gear S2 described above and the small-diametric gear P2b is engaged with the pinion P1 described above.

The carrier CR1 rotatably supports the pinions P1 and P2 by the front and rear carrier plates CR1b and CR1a. The rear carrier plate CR1a is coupled with the rear carrier plate CR0a of the power splitting planetary gear 21 described later via a coupling member 64. The coupling member 64 is formed in a body with a sleeve portion connected to the inner diametric rear end of the rear carrier plate CR1a of the carrier CR1 and extending to the rear and with a drum portion extending to the rear from the outer diametric end of the flange portion and is relatively and rotatably supported by the bearing m fitted between the inner peripheral face of the sleeve portion and the outer peripheral face of the input shaft 10. The carrier CR1 is relatively and rotatably supported by the bearing i described above and fitted to the inner diametric front face of the front carrier plate CR1b and the bearings l and j fitted respectively to the inner diametric front and rear faces of the rear carrier plate CR1b. It is noted that the bearing l is interposed between the carrier plate and the rear end face of the sun gear S1 described above.

The first brake B1 has a number of discs and friction plates (brake plates) and is spline-coupled between an outer peripheral spline formed on the outer peripheral face of the ring gear R1 described above and the inner spline 14a formed on the inner peripheral face of the casing member 14. The hydraulic actuator 37 for the first brake is disposed on the rear side of the first brake B1. The hydraulic actuator 37 has the piston 38 disposed on the rear side of the first brake B1 so as to be movable in the longitudinal direction, the first hydraulic chamber 40 which is provided at the outer diametric front face of the partition C and into which the rear end of the piston 38 is oil-tightly fitted, and the return spring (compression spring) 42 interposed between the retainer 41 fixed to the partition C and the inner diametric front face of the piston 38 to bias the piston 38 to the rear.

The second brake B2 is disposed just before the first brake B1 described above. The second brake B2 has a number of discs and friction plates (brake plates) and is spline-coupled between an outer peripheral spline formed on the outer peripheral face of the drum portion 35 combined with the sun gear S2 described above and the inner spline 14a formed on the inner peripheral face of the casing member 14. The hydraulic actuator 43 for the second brake is disposed on the front side of the second brake B2. The hydraulic actuator 43 has the piston 44 disposed before the second brake B2 so as to be movable in the longitudinal direction, the second hydraulic chamber 45 which is provided at the outer diametric rear face of the partition B and into which the front end of the piston 44 is oil-tightly fitted, and the return spring (compression spring) 47 interposed between the retainer 46 fixed to the partition B and the inner diametric rear face of the piston 44 to bias the piston 44 to the front.

In the transmission 22 constructed as described above, an output from the second electric motor 23 is transmitted to the sun gear S1 via the sleeve 63. In a low state, the first brake B1 is engaged and the second brake B2 is released. Accordingly, the ring gear R1 is locked and the sun gear S2 is freely rotatable in this state. The revolution of the sun gear S1 described above is extensively reduced via the pinion P1 and is transmitted to the carrier CR1. The revolution of the carrier CR1 is then transmitted to the output shaft 12.

When the transmission 22 is in a high state, the first brake B1 is released and the second brake B2 is engaged. Accordingly, the sun gear S2 is locked and the ring gear R1 is freely rotatable in this state. In this state, the revolution of the sun gear S1 is transmitted to the pinion P1 and the pinion P2 engages with the locked sun gear S2. Then, the carrier CR1 moves around the sun gear at a restricted predetermined number of revolution and the revolution of the carrier CR1 reduced in a relatively small extent is transmitted to the output shaft 12 at this time.

Thus, the transmission 22 transmits the extensively reduced revolution to the output shaft 12 in the low state by engaging the first brake B1 and by releasing the second brake B2, respectively. In contrast, the transmission 22 transmits the revolution reduced by a relatively small extent to the output shaft 12 by releasing the first brake B1 and by engaging the second brake B2, respectively. Because the transmission 22 is thus capable of shifting in the two stages, the second electric motor 23 maybe downsized. That is, the transmission 22 enables to use a small electric motor, to transmit sufficient driving torque to the output shaft 12 in the low state in starting the vehicle 1 when high torque is required, and to prevent the rotor 29 from rotating at high-speed by putting it in the high state when the output shaft 12 is rotating at high-speed.

The power splitting planetary gear 21 is disposed between the partitions C and D of the casing member 14. The power splitting planetary gear 21 comprises the double pinion planetary gear train disposed coaxially with the output shaft 12 as described above and has the ring gear (first rotary element) R0, the sun gear (second rotary element) S0 and the carrier (third rotary element) CR0 supporting the pinions P01 and P02. Among them, the ring gear R0 extends to the front and is fixed to the outer diametric end of a flange portion 61 extending to the outer diametric side along the carrier CR0 from the outer peripheral face near the rear end of the input shaft 10. The front carrier plate CR0b of the carrier CR0 is coupled with the front end of the output shaft 12. The sun gear S0 extends to the rear and is coupled with the rotor 25 of the first electric motor 20.

Bearings n through s are fitted to the following positions for the power splitting planetary gear 21. That is, the bearing n is fitted between the inner diametric rear face of the flange portion of the coupling member 64 and the inner diametric front face of the flange section 61, the bearing o is fitted between the inner peripheral rear face of the flange section 61 and the inner diametric front face of the front carrier plate CR0b, and the bearing p is fitted between the inner diametric rear face of the front carrier plate CR0b and the front end face of the sun gear S0, respectively. The bearing q is fitted between the outer peripheral face of the rear end of the input shaft 10 and the inner peripheral face of the cylindrical part at the front end of the output shaft 12, and the bearings r and s are fitted between the outer peripheral face of the cylindrical part and the inner peripheral face of the sun gear S0. These bearings n through s support the ring gear R0 rotatably with respect to the casing member 14 in a body with the input shaft 10 and the carrier CR0 and the sun gear S0 relative-rotatably with respect to the output shaft 12. Thus, in the power splitting planetary gear 21, the ring gear R0, which is the input section, is fixed to the input shaft 10, and the sun gear S0 and the carrier CR0, which are the output sections (to which power is split), are coupled with the front end of the rotor 25 of the first electric motor 20 and to the front end of the output shaft 12. That is, the power splitting planetary gear 21 is arranged so as to split the motive power of the internal combustion engine 5 inputted to the ring gear R0 via the input shaft 10 (see FIG. 1) to the side of the first electric motor 20 via the sun gear S0 and to the side of the output shaft 12 via the carrier CR0, respectively. The ratio of split power is decided based on the state of revolution of the first electric motor 20 described next. That is, when the rotor 25 of the first electric motor 20 is caused to generate a large power, an amount of power generated by the first electric motor 20 increases and the power outputted to the output shaft 12 is reduced to that extent. In contrast, when the rotor 25 of the first electric motor 20 is caused to generate a small power, an amount of power generated by the first electric motor 20 decreases and the power outputted to the output shaft 12 increases to that extent.

The first electric motor 20 comprises a permanent magnet synchronous motor (brushless DC motor) for example. It is stored in the space between the partitions B and C and is disposed on the outer diametric side of the output shaft 12 coaxially therewith. The first electric motor 20 has the stator 24 fixed to the inner peripheral face of the casing member 14 and the rotor 25 rotatably disposed on the inner diametric side of the stator 24 apart from the stator 24 by the predetermined air gap G1. The rotor 25 is formed into a cylindrical shape and stages 30 and 31 are formed at the front and rear outer peripheral faces of the cylindrical part. The casing member 14 rotatably supports the rotor 25 through an intermediary of bearings h and i fitted while being positioned in the longitudinal direction between these stages 30 and 31 and the partitions B and C. The ring gear R0 of the power splitting planetary gear 21 described above is fixed to the front end of the cylindrical part through the coupling member 71. The front end coupling section 12c of the output shaft 12 relatively and rotatably supports the cylindrical part and the coupling member 71 through an intermediary of bearings f, g and k fixed on the outer peripheral face of the front end coupling section 12c. It is noted that as for the longitudinal disposition, the bearings g and f are disposed at the position corresponding to the bearing h and the bearing k is disposed at the position corresponding to the bearing i. Because the rotor 25 of the first electric motor 20 is rotatably supported by the casing member 14 through the intermediary of the bearings h and i fixed to the partitions B and C, the longitudinal and radial directions of the rotor 25 may be assured accurately. Accordingly, even if a force bending the casing member 14 in the vertical or horizontal direction acts on the casing member 14, the predetermined air gap G1 between the stator 24 and the rotor 25 may be kept accurately. It is noted that the first electric motor 20 is connected to the HV battery via the inverter as described above. The main function of the first electric motor 20 constructed as described above is to generate electric power based on the power split to the sun gear S0 of the power splitting planetary gear 21 explained above and to drive the second electric motor 23 via the inverter or to charge the HV battery.

The rotor 25 supports the output shaft 12 through an intermediary of the bearings s and v provided at the positions axially overlapping with the bearings t and u, the sun gear S0 of the power splitting planetary gear 21 is fixed to the front end of the rotor 25, and the sun gear S0 is relatively and rotatably supported by the output shaft 12 through an intermediary of the bearings r and s fixed to the outer peripheral face on the front end of the output shaft 12.

The casing member 14 storing the second electric motor 23, the transmission 22, the power splitting planetary gear 21 and the first electric motor 20 as described above has the boss section 14b which extends to the rear on the inner diametric side of the partition E at the rear end thereof. The casing member 14 rotatably supports the output shaft 12 by the boss section 14b through an intermediary of bearings w and x.

The outer diametric side of the partition E of the casing member 14 is thickened to compose the mounting section 14c. The coupling section 14d at the front end of the casing member 14 is connected with the internal combustion engine 5 rubber-mounted to the body 4 (see FIG. 1) and the rear end thereof is rubber-mounted to the part 4a of the body by utilizing the mounting section 14c. That is, the part 4a of the body is provided with the rubber pedestal 51 to which the stay 55 is fixed by the bolt 52, the washer 53 and the nut 54. Then, the casing member 14 is mounted to the stay 55 described above by the bolt 56 screwed to the mounting section 14c near the rear end of the casing member 14. It is noted that because the casing member 14 is arranged so that the gap G3 between the bolt 52 on the part 4a side and the bolt 56 on the casing member 14 side is shorter than a screwing length of the bolt 56, the bolt 56 will not come out of the mounting section 14c and thus the rear end of the casing member 14 will not be put out of the body part 4a even if the bolt 56 is happened to be loosened.

Since the partitions D and E extending from the casing member 14 as the supporting members support the both sides of the rotor 25 of the first electric motor 20 through the intermediary of the bearings t and u as described above and the accuracy for supporting the rotor 25 is improved, the gap between the stator 24 and the rotor 25 may be reduced. Thereby, the output of the first electric motor 20 may be improved. Still more, since the mounting section 14c is provided at the position axially overlapping with the rear partition E among the two partitions D and E and the rigidity for supporting the rotor 25 may be improved, it becomes possible to suppress the vibration occurring in the casing member 14 and to reduce the vibration propagating from the casing member 14 to the body 4.

Fourth Embodiment

Next, a hybrid driving unit 7D of a fourth embodiment will be explained as another example of the inventive hybrid driving unit 7 mounted to the vehicle 1 shown in FIG. 1. The outline of the whole hybrid driving unit 7D will be explained at first with reference to the skeleton view in FIG. 14. It is noted that in the figure, the direction indicated by an arrow F denotes the front side of a body (the internal combustion engine side) and the direction indicated by an arrow R denotes the rear side thereof (the differential unit side).

Figure 14:
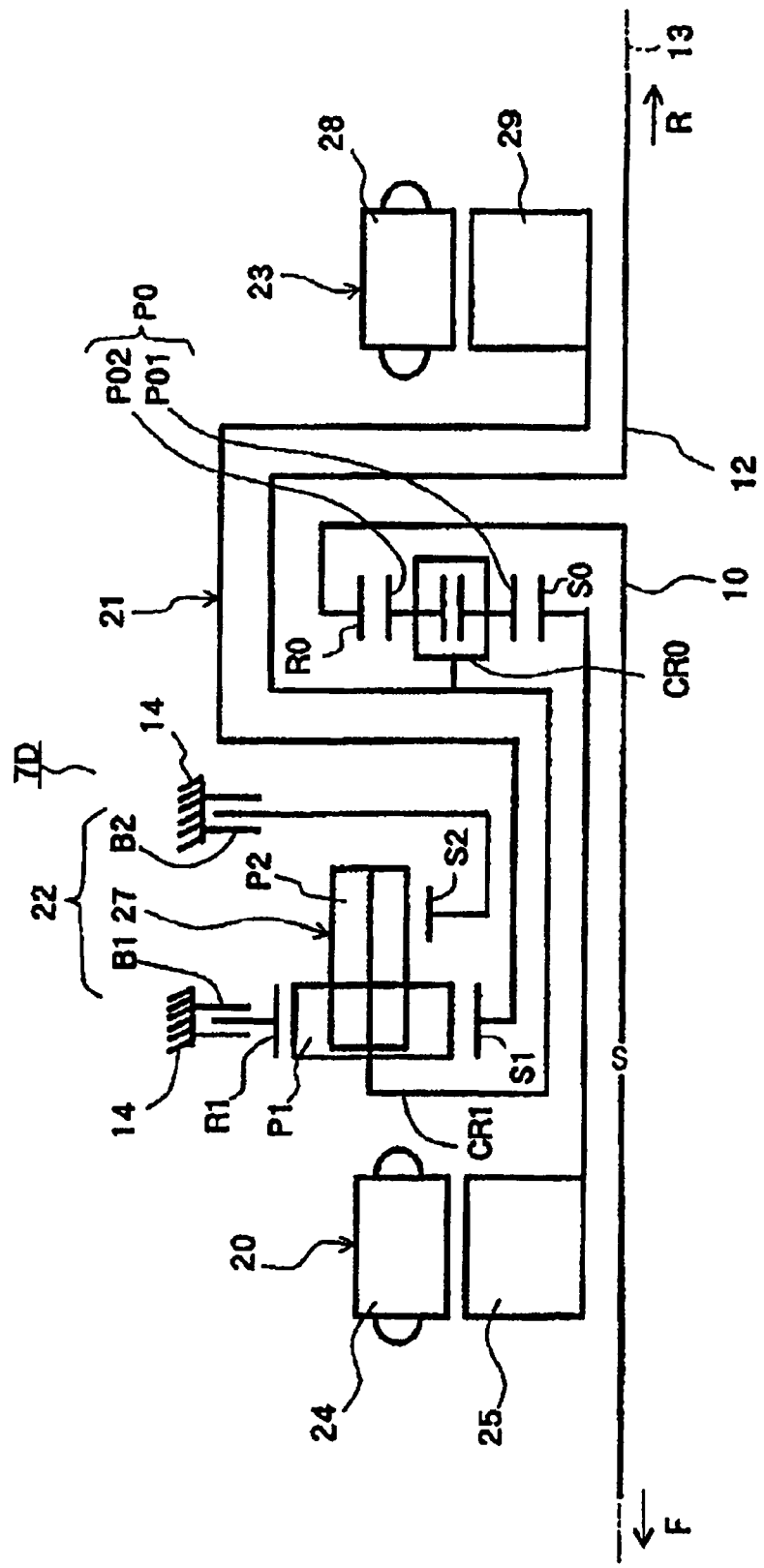
FIG. 14 is a skeleton view showing a hybrid driving unit of a fourth embodiment.

As shown in FIG. 14, the hybrid driving unit 7D comprises the first electric motor 20, the transmission 22, the power splitting planetary gear 21 and the second electric motor 23 in order from the side closer to the internal combustion engine 5 in FIG. 1, i.e., in order from the front side to the rear side. All of these are stored within the casing member 14 (see FIG. 1) and are disposed in line around the axis 13. These devices will be explained below in the order of the first electric motor 20, the transmission 22, the power splitting planetary gear 21 and the second electric motor 23.

The first electric motor 20 has the stator 24 fixed to the casing member 14 (see FIG. 1) and the rotor 25 rotatably supported on the inner diametric side of the stator 24. The rotor 25 of the first electric motor 20 is coupled with the sun gear S0 of the power splitting planetary gear 21 described later. The first electric motor 20 constructed as described above mainly generates electricity based on the motive power inputted via the sun gear S0 and drives the second electric motor 23 or charges the HV battery via the inverter not shown.

The transmission 22 has the so-called Ravigneaux type planetary gear unit 27 comprising one double pinion planetary gear train and the single planetary gear train that uses one of their pinions in common. The transmission 22 also has the first and second brakes B1 and B2.

The planetary gear unit 27 comprises two sun gears S1 and S2, the carrier CR1 supporting the pinion P1 and the pinion (common long pinion) P2, and the ring gear R1. Between the two pinions P1 and P2, the pinion P1 engages with the sun gear S1 and the ring gear R1, and the pinion P2, i.e., the common long pinion, engages with the sun gear S2 and the pinion P1. The ring gear R1 of the planetary gear unit 27 is coupled with the first brake B1 and the sun gear S2 is coupled with the second brake B2. As a whole, the sun gear S1, which is the input member, is coupled with the rotor 29 of the second electric motor 23 described next, and the carrier CR1, which is the output member, is coupled with the output shaft 12 similarly to the carrier CR0 of the power splitting planetary gear 21 described later. This transmission 22 is arranged so as to be able to change two deceleration stages where reduction ratios are different by engaging one of the first and second brakes B1 and B2 while releasing the other and by releasing the one while engaging the other as described later. That is, the transmission 22 is arranged so as to change the degree of the motive power inputted from the second electric motor 23 described above via the sun gear S1 and to transmit it to the output shaft 12 via the carrier CR1.

The power splitting planetary gear 21 comprises a double pinion planetary gear train disposed coaxially with the input shaft 10. The power splitting planetary gear 21 has the carrier (third rotary element) CR0 supporting a plurality of pinions P01 and P02, the sun gear (second rotary element) S0 engaging with the pinion P01 and the ring gear (first rotary element) R0 engaging with the pinion P02. The ring gear R0 of the power splitting planetary gear 21 is coupled with the input shaft 10, the sun gear S0 is coupled with the rotor 25 of the first electric motor 20 and the carrier CR0 is coupled with the output shaft 12. The power splitting planetary gear 21 constructed as described above splits the motive power inputted to the ring gear R0 via the input shaft 10 to the first electric motor 20 via the sun gear S0 and to the output shaft 12 via the carrier CR0 based on the control on the revolution of the first electric motor 20. It is noted that the power split to the first electric motor 20 is used for generating electricity and the power split to the output shaft 12 is used for driving the vehicle 1.

The second electric motor 23 is disposed at the rearmost side among the first electric motor 20, the transmission 22, the power splitting planetary gear 21 and the second electric motor 23, i.e., at the position furthest from the internal combustion engine 5. The second electric motor 23 has the stator 28 fixed to the casing member 14 (see FIG. 1) and the rotor 29 rotatably supported on the inner diametric side of the stator 28. The rotor 29 of the second electric motor 23 is coupled with a sun gear S1 of the transmission 22 described above.

Similarly to the first electric motor 20 described later, the second electric motor 23 is connected to the HV battery not shown via the inverter. However, their main functions differ from each other. That is, differing from the first electric motor 20 which functions mainly for the purpose of power generation, the second electric motor 23 functions mainly as a driving motor for assisting the motive power (driving force) of the vehicle 1. However, the second electric motor 23 also functions as a generator in braking the vehicle for example by regenerating vehicular inertia force as electrical energy.

Among the first electric motor 20, the transmission 22, the power splitting planetary gear 21 and the second electric motor 23 described above, the first and second electric motors 20 and 23 are heavy devices which are heavier than the power splitting planetary gear 21 and the transmission 22. Then, in the present embodiment, the second electric motor 23, i.e., one of the heavy devices, is disposed at the rearmost position among the first electric motor 20, the transmission 22, the power splitting planetary gear 21 and the second electric motor 23, i.e., at the position furthest from the internal combustion engine 5 as shown in FIG. 14.

The first electric motor 20, the transmission 22, the power splitting planetary gear 21 and the second electric motor 23 are stored in the casing member not shown similar to those in the first through third embodiments while being separated by the partitions not shown. The casing member is provided with a mounting section (see the mounting section 14c in FIG. 3 for example) near the rear end thereof (near the rear part of the second electric motor 23 disposed at the rearmost) similarly to the first embodiment and the casing member is rubber-mounted to a part of the body through the mounting section.

It is noted that not only the hydraulic actuator, but also a ball screw mechanism, an electric actuator using an electric motor or other actuators may be used for the first and second brakes B1 and B2 explained in the first through fourth embodiments. Furthermore, not only the frictional engaging elements, but also an interlocking type element may be used.

It is also needless to say that not only the one described in the embodiments, but also another automatic transmission of two, three or more stages or an automatic transmission having increased speed stages (O/D) and a continuous variable transmission (CVT) may be used for the transmission 22 described above. Still more, the output of the transmission 22 may be linked not only to the output shaft 12 but also to any part of the power train system from the output shaft 12 to the driving wheels.

Fifth Embodiment

In the invention, the casing member 14 is provided with the coupling section 14d which is capable of fixing the casing member to the internal combustion engine 5 at the front end thereof and with the mounting section 14c capable of supporting the casing member to the body 4 at the rear end thereof. Then, among the first electric motor 20, the power splitting planetary gear 21, the transmission 22 and the second electric motor 23, the second electric motor 23 is disposed at the rearmost end in the first and second embodiments (see FIGS. 3 and 8) and the first electric motor 20 is disposed at the rear most end in the third embodiment (see FIG. 13). Further, as for the relationship of longitudinal position (along the axis 13) between the first electric motor 20 or the second electric motor 23 disposed at the rearmost part and the mounting section 14c, the mounting section 14c is provided at the partition E, among the partitions A through E of the casing member 14, disposed just behind the first electric motor 20 or the second electric motor 23 disposed at the rearmost part, i.e., near the rear end of the casing member 14. It is noted that although not shown, the mounting section 14c may be provided at the partition E also in the forth embodiment in the same manner.

When the mounting section 14c is provided at the partition E of the casing member 14, it becomes possible to prevent the casing member 14 from deforming because the partition E is the part where the rigidity is the highest in the casing member 14. Because it becomes possible to suppress the influence on the support of the shafts (support for the input shaft 10 and the output shaft 12) caused by the deformation of the casing member 14, it becomes advantageous in terms of NV (noise), vibration and durability.

Figure 15:
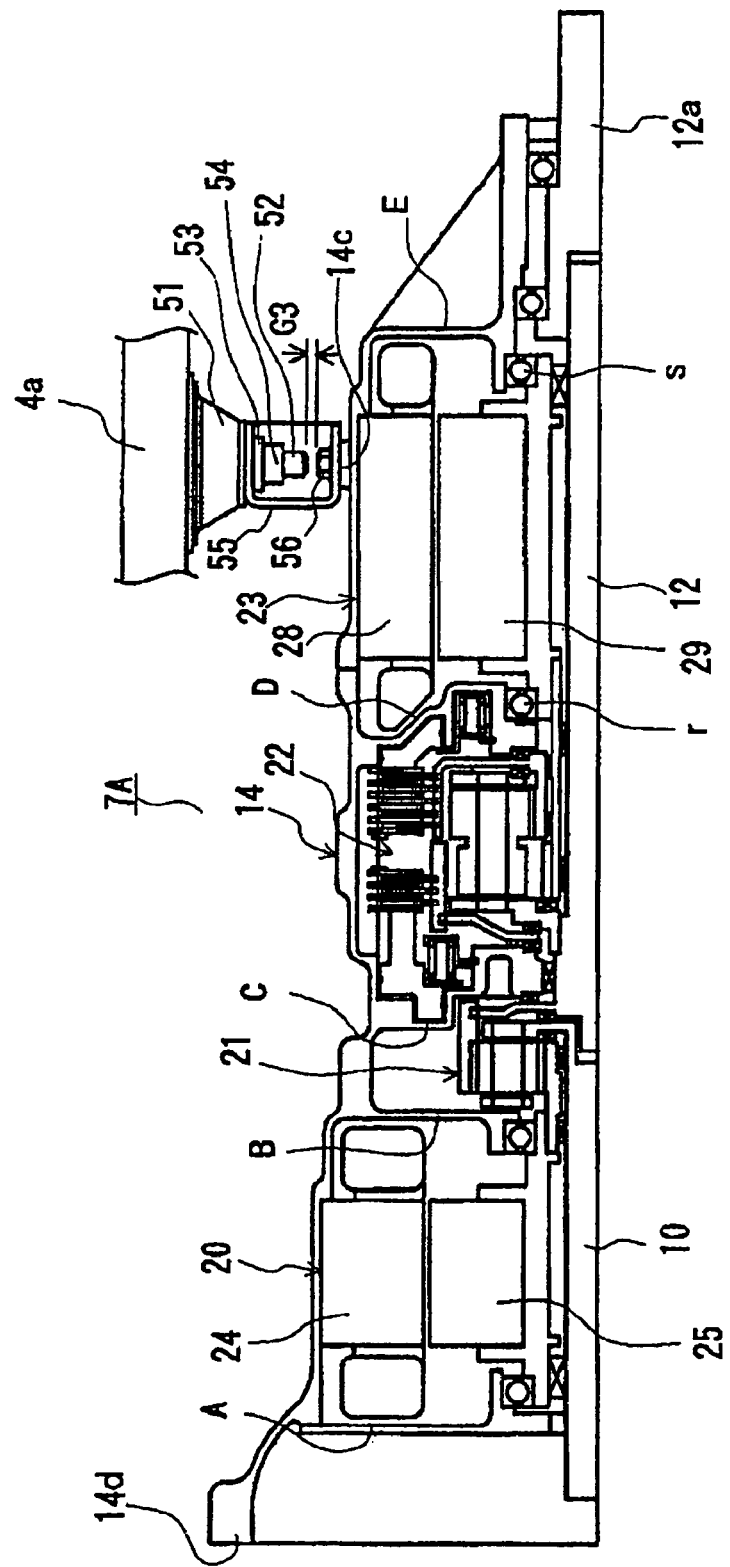
FIG. 15 is a skeleton view showing a hybrid driving unit of a fifth embodiment.

In view of the above-discussed exemplary aspects of the present invention, the mounting section 14c is set at the position longitudinally overlapping with the second electric motor 23 in the casing member 14 as shown in FIG. 15. It is noted that the reference characters in FIG. 15 correspond to those in FIG. 3 in the present embodiment.

In the present embodiment, the mounting section 14c is provided at the position before the partition E and overlapping with the second electric motor 23, i.e., at the position between the partitions D and E at the outer peripheral wall of the casing 14.

The coupling section 14d at the front end of the casing member 14 is connected with the internal combustion engine 5 rubber-mounted to the body 4 (see FIG. 1) and the rear end thereof is rubber-mounted to the part 4a of the body by utilizing the mounting section 14c. That is, the part 4a of the body is provided with the rubber pedestal 51 to which the stay 55 is fixed by the bolt 52, the washer 53 and the nut 54. Then, the casing member 14 is mounted to the stay 55 described above by the bolt 56 screwed to the mounting section 14c near the rear end of the casing member 14. It is noted that because the casing member 14 is arranged so that the gap G3 between the bolt 52 on the part 4a side and the bolt 56 on the casing member 14 side is shorter than a screwing length of the bolt 56, the bolt 56 will not come out of the mounting section 14c and thus the rear end of the casing member 14 will not be put out of the body part 4a even if the bolt 56 is happened to be loosened.

When the mounting section 14c is provided at the position overlapping with the second electric motor 23, it becomes possible to suppress the vibration of the casing member 14 and becomes advantageous in terms of resonance of the power train and sound filled therein because the mounting section 14c is located at the position close to the center of gravity of the second electric motor 23 which is the heavy device.

It is noted that although the cases when the first electric motor 20, the power splitting planetary gear 21, the transmission 22 and the second electric motor 23 are disposed in order from the front side of the casing member 14 has been explained in the explanation above (corresponding to the first embodiment shown in FIG. 3), the invention is not limited to that and is applicable to all modes including the modifications described above. However, when the first electric motor 20 is disposed at the rearmost part (corresponding to the third embodiment shown in FIG. 13), the mounting section 14c is provided at the position overlapping with the first electric motor 20 which is the heavy device.

Sixth Embodiment

Figure 16:
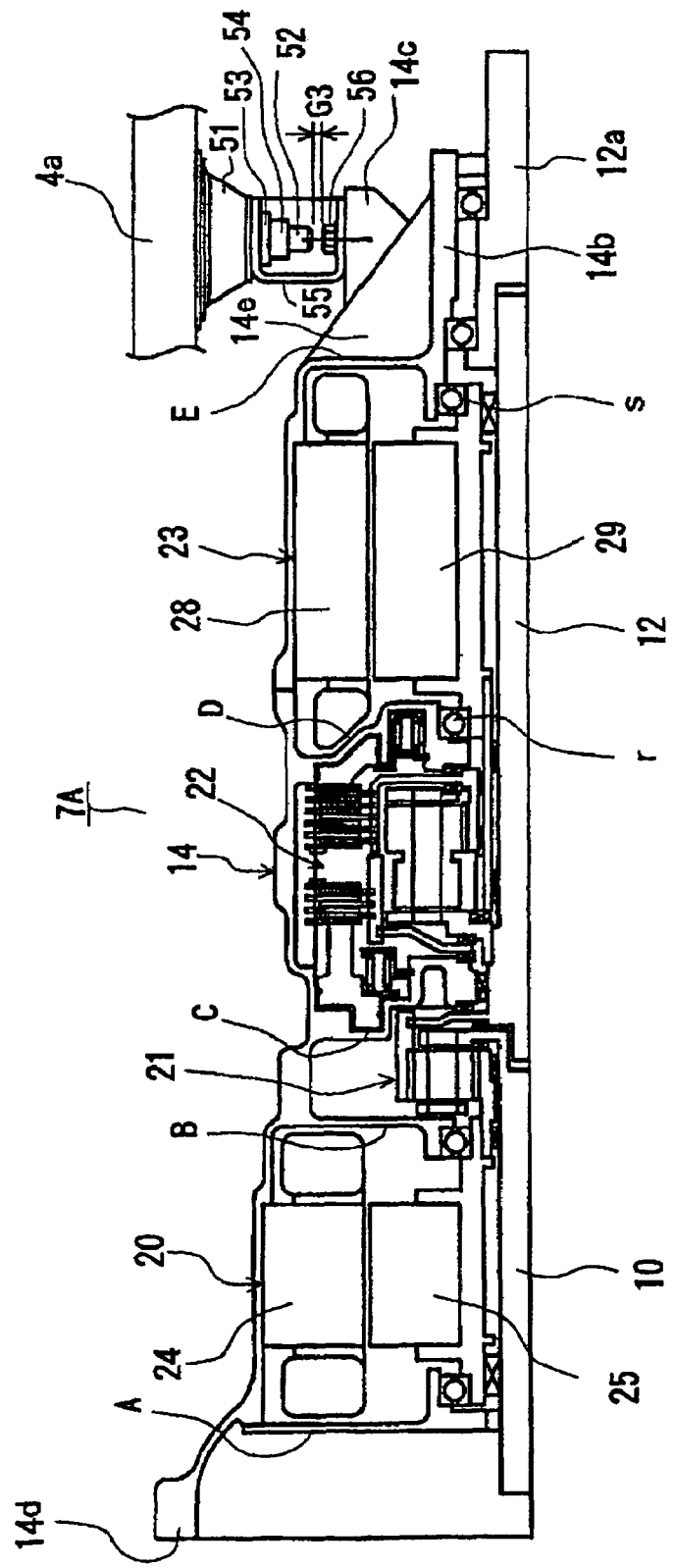
FIG. 16 is a skeleton view showing a hybrid driving unit of a sixth embodiment.

According to the present embodiment, the mounting section 14c is set at the position longitudinally behind the second electric motor 23 as shown in FIG. 16. It is noted that the reference characters in FIG. 16 correspond to those in FIG. 3.

In the present embodiment, the mounting section 14c is provided behind the partition E, i.e., in a triangular rib 14e formed between the partition E of the casing member 14 and the outer peripheral face of the boss-section 14b extending to the rear on the inner diametric side of the partition E.

The coupling section 14d at the front end of the casing member 14 is connected with the internal combustion engine 5 rubber-mounted to the body 4 (see FIG. 1) and the rear end thereof is rubber-mounted to the part 4a of the body by utilizing the mounting section 14c. That is, the part 4a of the body is provided with the rubber pedestal 51 to which the stay 55 is fixed by the bolt 52, the washer 53 and the nut 54. Then, the casing member 14 is mounted to the stay 55 described above by the bolt 56 screwed to the mounting section 14c near the rear end of the casing member 14. It is noted that because the casing member 14 is arranged so that the gap G3 between the bolt 52 on the part 4a side and the bolt 56 on the casing member 14 side is shorter than a screwing length of the bolt 56, the bolt 56 will not come out of the mounting section 14c and thus the rear end of the casing member 14 will not be put out of the body part 4a even if the bolt 56 is happened to be loosened.

Since the mounting section 14c is provided behind the partition E which is located behind the second electric motor 23, the mounting section 14c may be set at a part of the casing member 14 having a small diameter. It allows the hybrid driving unit 7A to be mounted to the body 4 more compactly.

It is noted that although the cases when the first electric motor 20, the power splitting planetary gear 21, the transmission 22 and the second electric motor 23 are disposed in order from the front side of the casing member 14 has been explained in the explanation above (corresponding to the first embodiment shown in FIG. 3), the invention is not limited to that and is applicable to all modes including the modifications described above. However, when the first electric motor 20 is disposed at the rearmost part (corresponding to the third embodiment shown in FIG. 13), the mounting section 14c is provided at the position behind the partition E located behind the first electric motor 20 which is the heavy device.

INDUSTRICAL APPLICABILITY

The inventive hybrid driving unit described above is applicable to vehicles and is suitably applicable specifically to FR vehicles.

The invention claimed is:

1. A hybrid driving unit, comprising:
an input shaft for inputting motive power from an internal combustion engine;
an output shaft disposed on an axis in line with said input shaft and interlocking with driving wheels;
a first electric motor disposed on said axis and comprising a first stator and a first rotor;
a power splitting planetary gear disposed on said axis and comprising a first rotary element coupled with said input shaft, a second rotary element coupled with said rotor of said first electric motor and a third rotary element coupled with said output shaft;
a second electric motor disposed on said axis and comprising a second stator and a second rotor; and
a transmission disposed on said axis and shifting and transmitting revolution of said second rotor of said second electric motor to said output shaft, wherein: said first electric motor, said power splitting planetary gear, said second electric motor and said transmission are stored in a casing member while being disposed in line on said axis;
said first and second stators of said first and second electric motors, respectively, are fixed to said casing member;
said casing member is provided, at a front end thereof, with a coupling section fixed to said internal combustion engine and at a rear end thereof, with a mounting section supported by a vehicle body;
said second electric motor is disposed in a rearmost part with respect to said power splitting planetary gear, said first electric motor, and said transmission disposed along said axis in said casing member;
said second rotor of said second electric motor is coupled only with said transmission; and
a driving torque of said second electric motor is transmitted with said output shaft only via said transmission.

2. The hybrid driving unit as set forth in claim 1, wherein supporting members extending from said casing member support both sides of said second rotor, disposed in the rearmost end through an intermediary of bearing members; and
said mounting section is provided at the position axially overlapping with a rear supporting member of said supporting members.

3. The hybrid driving unit as set forth in claim 2, wherein said output shaft is disposed through the inner peripheral side of said second electric motor and is supported by said second rotor through an intermediary of bearing members.

4. The hybrid driving unit as set forth in claim 1, wherein said first electric motor is disposed in a foremost position with respect to said power splitting planetary gear and said transmission disposed on said axis in said casing member.

5. The hybrid driving unit as set forth in claim 4, wherein supporting members extending from said casing member support said first rotor of said first electric motor through an intermediary of bearing members, and said input shaft is coupled with said power splitting planetary gear through an inner peripheral side of said first rotor of said first electric motor and is supported by said first rotor of said first electric motor through another intermediary of bearing members.

6. The hybrid driving unit as set forth in claim 4, wherein said first electric motor, said transmission, said power splitting planetary gear and said second electric motor are disposed in order from a side closer to said internal combustion engine.

7. The hybrid driving unit as set forth in claim 6, wherein said input shaft passes through an inner peripheral side of said first electric motor and said transmission and is coupled with said first rotary element, and said output shaft passes through an inner peripheral side of said transmission and said second electric motor.

8. The hybrid driving unit as set forth in claim 7, wherein said power splitting planetary gear comprises a single pinion planetary gear train;
said input shaft passes through an inner peripheral side of said power splitting planetary gear and is coupled with a transmission side of a carrier of said single pinion planetary gear train;
said output shaft passes through between said power splitting planetary gear and said transmission and is coupled with a ring gear of said single pinion planetary gear train; and
said first rotor of said first electric motor is coupled with a sun gear of said single pinion planetary gear train.

9. The hybrid driving unit as set forth in claim 7, wherein said power splitting planetary gear comprises a single pinion planetary gear train;

said input shaft passes through between said first electric motor and said power splitting planetary gear and is coupled with a carrier of said single pinion planetary gear train on a side of said first electric motor;

said output shaft is coupled with a sun gear of said single pinion planetary gear; and said first rotor of said first electric motor is coupled with a ring gear of said single pinion planetary gear.

10. The hybrid driving unit as set forth in claim 7, wherein said power splitting planetary gear comprises a double pinion planetary gear train;

said input shaft passes through an inner peripheral side of said power splitting planetary gear and is coupled with a ring gear of said double pinion planetary gear train;

said output shaft passes through an outer peripheral side of said power splitting planetary gear and between said first rotor of said first electric motor and said power splitting planetary gear and is coupled with a carrier of said double pinion planetary gear train on the first electric motor side; and said first rotor of said first electric motor is coupled with a sun gear of said double pinion planetary gear train.

11. The hybrid driving unit as set forth in claim 7, wherein said power splitting planetary gear comprises a double pinion planetary gear train;

said input shaft passes adjacent to said first electric motor and said power splitting planetary gear and is coupled with a ring gear of said double pinion planetary gear train;

said output shaft is coupled with a sun gear of said double pinion planetary gear; and said first rotor of said first electric motor is coupled with a carrier of said double pinion planetary gear on a transmission side through an outer peripheral side of said power splitting planetary gear.

12. The hybrid driving unit as set forth in claim 1, wherein said power splitting planetary gear, said first electric motor, said transmission and said second electric motor are disposed in order from a side closer to said internal combustion engine.

13. The hybrid driving unit as set forth in claim 12, wherein said output shaft passes through an inner peripheral side of said power splitting planetary gear, said first electric motor, said transmission and said second electric motor.

14. The hybrid driving unit as set forth in claim 13, wherein said power splitting planetary gear comprises a single pinion planetary gear train;

said input shaft is coupled with a front side of a carrier of said single pinion planetary gear train;

said output shaft is coupled with a sun gear of said single pinion planetary gear train; and said first rotor of said first electric motor is coupled with a ring gear of said single pinion planetary gear train.

15. The hybrid driving unit as set forth in claim 13, wherein said power splitting planetary gear comprises a single pinion planetary gear train;

said input shaft is coupled with a carrier of said single pinion planetary gear train on a side of the first electric motor;

said output shaft is coupled with a ring gear of said single pinion planetary gear through a part between said power splitting planetary gear and said first electric motor; and said first rotor of said first electric motor is coupled with a front side of said carrier of said single pinion planetary gear through an outer peripheral side of said power splitting planetary gear.

16. The hybrid driving unit as set forth in claim 13, wherein said power splitting planetary gear comprises a double pinion planetary gear train;

said input shaft is coupled with a ring gear of said double pinion planetary gear train;

said output shaft is coupled with a carrier of said double pinion planetary gear train through a part between said input shaft and said power splitting planetary gear; and said first rotor of said first electric motor is coupled with a sun gear of said double pinion planetary gear train.

17. The hybrid driving unit as set forth in claim 13, wherein said power splitting planetary gear comprises a double pinion planetary gear train;

said input shaft is coupled with a ring gear of said double pinion planetary gear train;

said output shaft is coupled with a sun gear of said double pinion planetary gear; and said first rotor of said first electric motor is coupled with a carrier of said double pinion planetary gear on a side of the first rotor of said first electric motor.

18. The hybrid driving unit as set forth in anyone of claim 1, wherein said transmission comprises a planetary gear.

19. The hybrid driving unit as set forth in claim 18, wherein said transmission comprises at least four shifting elements, a first shifting element of said at least four shifting elements is coupled with said second rotor of said second electric motor, said second shifting element of said at least four shifting elements is coupled with said output shaft and said transmission comprises braking elements which are capable of fixing third and fourth shifting elements of said at least four shifting elements to said casing member, respectively.

20. The hybrid driving unit as set forth in claim 18, wherein said planetary gear of said transmission comprises a Ravigneaux type planetary gear and a carrier of said Ravigneaux type planetary gear is coupled with said output shaft.

21. The hybrid driving unit as set forth in anyone of claim 1, wherein one of said first and second electric motors is a device heavier than said power splitting planetary gear and said transmission.

22. The hybrid driving unit as set forth in claim 1, wherein supporting members extending from said casing member support both sides of said rotor of said one of said first electric motor and said second electric motor disposed in the rearmost end through an intermediary of bearing members; and said mounting section is provided between a front supporting member and a rear supporting member.

23. The hybrid driving unit as set forth in claim 1, wherein supporting members extending from said casing member support both sides of said rotor of said one of said first electric motor and said second electric motor disposed in the rearmost end through an intermediary of bearing members; and said mounting section is provided at a position on a rear side of a rear supporting member among said supporting members.

24. A vehicle comprising an internal combustion engine, hybrid driving means and rear wheels as driving wheels to which driving force is transmitted from said hybrid driving means, wherein said hybrid driving means is said hybrid driving unit described in claim 1; and said hybrid driving unit is disposed such that the input and output shafts on the axis are longitudinally disposed substantially on a same axial line with a propeller shaft as said internal combustion engine is disposed on a front side of the body.

* * * * *